United States Patent
Gormish et al.

(10) Patent No.: US 8,081,827 B2
(45) Date of Patent: Dec. 20, 2011

(54) COMPRESSED DATA IMAGE OBJECT FEATURE EXTRACTION, ORDERING, AND DELIVERY

(75) Inventors: Michael J. Gormish, Redwood City, CA (US); Yinqing Zhao, San Diego, CA (US); Kathrin Berkner, Los Altos, CA (US); Martin Boliek, San Francisco, CA (US); Edward L. Schwartz, Sunnyvale, CA (US)

(73) Assignee: Ricoh Co., Ltd., Tokyo (JP)

( * ) Notice: Subject to any disclaimer, the term of this patent is extended or adjusted under 35 U.S.C. 154(b) by 1165 days.

(21) Appl. No.: 11/365,442

(22) Filed: Feb. 28, 2006

(65) Prior Publication Data

US 2007/0201752 A1    Aug. 30, 2007

(51) Int. Cl.
  *G06K 9/36* (2006.01)
(52) U.S. Cl. ......................... 382/232; 345/1.1
(58) Field of Classification Search .................. 382/232; 345/1.1
  See application file for complete search history.

(56) References Cited

U.S. PATENT DOCUMENTS

| | | | | |
|---|---|---|---|---|
| 5,715,445 | A * | 2/1998 | Wolfe | 1/1 |
| 7,003,566 | B2 * | 2/2006 | Codella et al. | 709/224 |
| 7,293,007 | B2 * | 11/2007 | Ma et al. | 1/1 |
| 2002/0075331 | A1 * | 6/2002 | Orbanes et al. | 345/854 |
| 2003/0165273 | A1 * | 9/2003 | Berkner et al. | 382/240 |
| 2004/0146199 | A1 * | 7/2004 | Berkner et al. | 382/176 |

OTHER PUBLICATIONS

ISO/IEC JTC 1/SC 29/WG1 N2401; "JPEG 2000 Part 6 FCD 15444-6"; Nov. 2001, pp. 1-76.*

* cited by examiner

*Primary Examiner* — Vikkram Bali
*Assistant Examiner* — Eueng-Nan Yeh
(74) *Attorney, Agent, or Firm* — Blakely, Sokoloff, Taylor & Zafman LLP

(57) ABSTRACT

A method and apparatus is disclosed herein for processing document images. In one embodiment, the method comprises extracting one or more features corresponding to one or more objects from a JPM compressed file, including extracting at least one of the one or more features without decoding, ranking document objects based on a task being performed by an application, and the one or more extracted features, and selecting a set of the document objects based on rank and at least one constraint.

26 Claims, 15 Drawing Sheets

COMPRESSED DATA IMAGE OBJECT FEATURE EXTRACTION, ORDERING, AND DELIVERY

FIELD OF THE INVENTION

The present invention relates to the field of image processing; more particularly, the present invention relates to extracting features of compressed data image objects, ordering the objects and delivering portions of the compressed representations.

BACKGROUND OF THE INVENTION

JPEG 2000 is a state-of-the-art continuous-tone image coding system. Based on wavelet transform technology followed by bit-plane coding, JPEG 2000 generally provides better rate-distortion performance than the discrete cosine transform based JPEG coding system. However, the real advantages of JPEG 2000 are features such as the access of different resolutions, progressive bit-rates from very lossy to lossless, access to regions-of-interest, and access to color components.

The JPM standard is described in "Information technology—JPEG 2000 Image Coding System—Part 6: Compound image file format, ISO/IEC 15444-6:2002" available from the ISO. JPEG 2000 Part 6 (JPM) is a file format designed to represent the visual appearance of a document. JPM provides an efficient way to store mixed raster content (MRC) data. JPM can provide excellent compression by use of the appropriate compressor. JPM allows multiple pages to be stored in a file. JPM also allows references to external files. The file can be large because there may be hundreds of pages or very high-resolution images. Thus, effective use of the JPM format requires the ability to extract parts of the file and re-assemble it under specific constraints. For example, it may be useful to extract a screen resolution version of the first few pages of a 500-page document or to extract the parts of the file according to a client's interest. With the advances in computer networking and personal computing devices, network access to document databases is increasingly important.

JPEG 2000 Part 9 (JPIP) is a standard for interactive communication of JPEG 2000 images. It is defined in the ISO Standard, "Information technology—JPEG 2000 Image Coding System—Part 9: Interactivity tools, APIs and protocols, ISO/IEC 15444-9:2004." JPIP allows the region and resolution required by the client to be transmitted over a network. Additional requests for data are efficient in the sense that previously transmitted data is not repeated. JPIP is being extended to operate with JPM files (in addition to JP2 and MJ2 file formats previously supported), by the JPEG committee. This extension will become an amendment to the JPIP standard, "Information technology—JPEG 2000 Image Coding System—Part 9: Interactivity tools, APIs and protocols, AMENDMENT 1: API's, metadata, and editing," it is currently in progress.

TRUEW (interactive access to JPEG 2000 imagery) includes image processing techniques that operate on JPEG 2000 and other compressed files. In TRUEW, the image objects are typically tiles in the original image and are stored as tile-parts in the compressed file. Tile-parts are selected from a JPEG 2000 compressed file based on spatial intersection with a view-window requested by a client. Upon selection, the objects are delivered in a special compressed format without transcoding, until all objects needed to fill the user's request have been delivered or a new view window request has been received from the client. For more information on TRUEW, see U.S. patent application Ser. No. 10/273,734, entitled, "Transport of Reversible and Unreversible Embedded Wavelets" filed Oct. 18, 2002; U.S. patent application Ser. No. 10/384,277, entitled, "Communication of Compressed Digital Images," filed Mar. 7, 2003; and U.S. patent application Ser. No. 10/614,877, entitled, "Network Access to Partial Document Images," filed Jul. 7, 2003, all assigned to the corporate assignee of the present application.

SmartNails are small representations of images or documents, like thumbnails or icons, but with more relevant information. The SmartNails methods include extracting data from the headers of a JPEG 2000 codestream. This allows regions of a JPEG 2000 image to be selected without doing pixel level processing which can be much more computationally complex and thus operate slowly. The SmartNails methods operate on a small part of a JPEG 2000 image. For more information on SmartNails, see U.S. patent application Ser. No. 10/044,603, entitled, "Content and Display Device Dependent Creation of Smaller Representations of Images" filed: Jan. 11, 2002, assigned to the corporate assignee of the present invention. SmartNail analysis of JPEG 2000 headers is combined with text-focused OCR analysis to create thumbnails of document images. For more information, see U.S. patent application Ser. No. 10/354,811, entitled, "Reformatting Documents Using Document Analysis Information", filed Jan. 29, 2003, and U.S. patent application Ser. No. 11/023,142, entitled, "Semantic Document SmartNails," filed Dec. 22, 2004, both assigned to the corporate assignee of the present invention, and Berkner, Schwartz, & Marle, "SmartNails—display and image dependent thumbnails", Proceedings of SPIE Vol. 5296, Jan. 21-22, 2004.

Information can be extracted from JPEG 2000 files without doing complete decoding. Both bit allocation and some wavelet coefficient information is available from the packet headers. This information can be used when a page image is compressed solely by JPEG 2000 to do some retrieval or classification operations. For more information, see U.S. patent application Ser. No. 10/044,420, entitled, "Header-based Processing of Images Compressed Using Multi-scale Transforms," filed Jan. 10, 2002, assigned to the corporate assignee of the present invention.

Web browsers have long been able to prefetch documents based on HTML links or HTTP header lines. In this case, the browser generates additional requests, possibly to different servers based on the content of the current document.

maps.google.com currently provides the ability to view a very large data set, namely, the street maps and aerial photography for much of the world. This data is presented in a web browser and controls are provided to the user to allow pan and zoom. In fact, the user is able to "drag" the current display with the mouse and new regions come into view and are displayed. In the google maps case, the image being shown to the end user is a combination of multiple independently accessible images, which are rendered next to each other. As in the HTML case, the browser is able to generate additional requests for map images near the current displayed region of the map.

SUMMARY OF THE INVENTION

A method and apparatus is disclosed herein for processing document images. In one embodiment, the method comprises extracting one or more features corresponding to one or more objects from a JPM compressed file, including extracting at least one of the one or more features without decoding, ranking document objects based on a task being performed by an application, and the one or more extracted features, and selecting a set of the document objects based on rank and at least one constraint.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
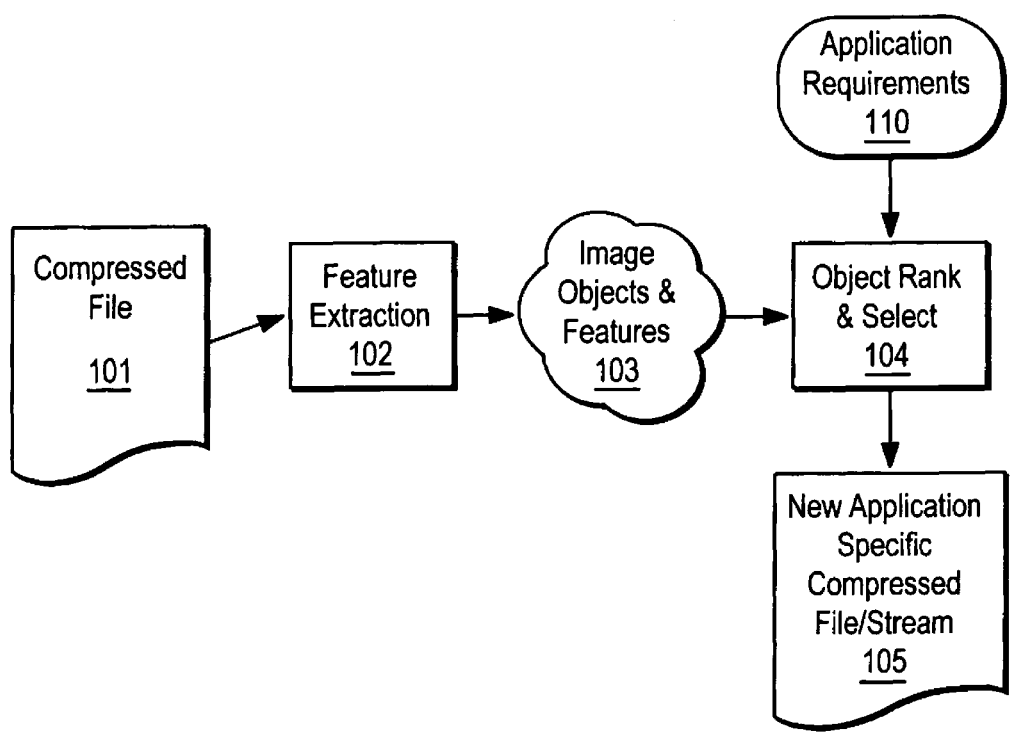
FIG. 1 is a block diagram of an image processing system.

A method and apparatus for extracting features from compressed data image objects, ordering the extracted features and delivering the ordered extracted features. Such operations may be useful for generating small representations of images or documents (e.g., SmartNails) as well as for use in pan and zoom browsing of compressed image types (e.g., JPEG 2000) or other image types. When browsing compressed images, the techniques described herein operate on portions of a compressed document, as opposed to a decompressed document. The techniques described herein may also be useful for prefetching of image components for display over a network, document classification based on compressed header information, and other applications.

In one embodiment, the techniques set forth herein include object ranking, selection, and prefetching for efficient access to JPEG2000 Part 6 (JPM) files over the network, bit allocation and type-maps for JPM and PDF files, and some specific applications for document object parsing and network document access.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1 is a block diagram of an image processing system. Referring to FIG. 1, a feature extraction unit 102 receives a compressed file 101 and extracts a set of one or more features. In one embodiment, compressed file 101 comprises a JPEG 2000 file. In an alternative embodiment, compressed file 101 is a JPM file. In yet another embodiment, compressed file 101 comprises a PDF file, SVG, SMIL, FLASH, PPML, XML-FO or other file type.

In one embodiment, the one or more features are associated with a document object. The extraction is performed on an input file using information from all available sources.

In one embodiment, extraction is performed without decoding compressed codestreams. In such a case, after feature extraction, a set of image objects and features 103 are available. In alternative embodiments, the features are associated with all regions of a page affected by the object. Typical features that can be obtained from header data include position and size of an object, the number of bytes for a codestream, and the type of compression used for the codestream. Some information can be obtained from header data of a codestream without decompressing the codestream. Image size is typically in header information, as is color space, some type of encoding parameters like a quantization table, and bit depth of imagery. Further information might be associated with an object in metadata. For example, keywords, or words obtained from an Optical Character Recognition (OCR) process might be associated with an object or with a region on a page. Other metadata might be computed before compression and stored in the file along with the compressed file, such as, for example, reading order of objects, estimates of the mean squared error or visual impact of an object, or locations of faces. Sometimes, especially with a JPEG 2000 codestream or file, the information may be localized to a part of the codestream, e.g. a tile, precinct, spatial location, or resolution, or color plane.

An object rank and select unit 104 receives the set of image objects and features 103 and ranks them based on application requirements 110. In one embodiment, the document objects are ranked based on the application, the task being performed by the application, and the extracted features. Some example application requirements include limited bandwidth or file-size, color restrictions (e.g., black and white only), display resolution, or minimum quality needed. Object rank and select unit 104 also creates a subset of the image objects and features 103 based on one or more limits. In one embodiment, selection of image objects is made by selecting the highest ranking objects until a constraint is reached. These constraints include display size, time for transmission, file size, estimated decompression time, and total area of imagery.

The image processing system outputs a new form for the compressed data. In one embodiment, the new form is a new compressed file or a stream in a compressed or streaming format. Alternatively, the image processing system outputs the compressed data for decoding and display or rendering. In such a case, the operations necessary for outputting displaying and/or rendering may be performed as described in see U.S. patent application Ser. No. 10/044,603, entitled, "Content and Display Device Dependent Creation of Smaller Representations of Images," filed Jan. 11, 2002, U.S. patent application Ser. No. 10/354,811, entitled, "Reformatting Documents Using Document Analysis Information", filed Jan. 29, 2003, and U.S. patent application Ser. No. 11/023,142, entitled, "Semantic Document SmartNails," filed Dec. 22, 2004, all assigned to the corporate assignee of the present invention.

The image processing system of FIG. 1 described above is particularly useful in mobile device applications or other limited processing power or memory device applications in which network access to a document (e.g., a JPM document) is provided. (Note that a major characteristic of network access to JPM documents is client heterogeneity in terms of network bandwidth condition and device profile.) For example, a mobile client has a limited wireless connection and a small screen size. It is thus desirable that the server delivers the requested objects in an order to maximize some sort of quality until some limit is reached. For example, the server can deliver the objects in the order that "fills" the client view port in the minimum amount of time. In the situation that the client has low bandwidth connection to the server, the server could predict the next request and send the data when the channel is idle. Then the client can obtain the data from local cache, which saves the client waiting time.

Compressed File Formats and Extracted Features

There are a number of features that may be extracted from various file formats. For example, for JPEG 2000 files, bit-allocation maps, OCR results, and tile-parts may extracted.

In JPM and PDF files, the "page" is not consistently divided into "codeblocks" and "tiles" as it is in a single JPEG 2000 file. However, it is possible to generate the bit-allocation maps and tile-part information for those regions of a JPM or PDF that contain JPEG 2000 codestreams. JPM and PDF files can also contain codestreams that are compressed with a codec other than JPEG 2000 including JPEG, JBIG, and G4. These compression systems have less information available in the header, i.e. without decoding, than a JPEG 2000 codestream does. Nevertheless, a "bit-allocation" map can still be created by assuming the bits for the codestream are spread evenly over the bounding box for the codestream. An empirical weighting can be used to scale this information relative to the JPEG 2000 codestreams. Metadata can be used to produce weightings, e.g. more weight on the locations where people are in a photo.

In addition to compressed codestreams, PDF files can contain "content" streams with drawing commands which include text rendering. The size of the content stream and the bounding box can be determined from the PDF headers.

A document page may be generated in a word processing application containing text, continuous tone imagery, and a few simple drawings. The document might be saved as a PDF file, or JPM file or other file type directly from the application it was created in, or a postscript file might be later converted to one of these formats. Alternatively, this document is printed and later scanned, with the scanned version being saved as a JPEG 2000 file, a JPM file, a PDF file, or some other format.

If the document is stored as a JPEG 2000 file, then a bit-allocation map can be created as described in the U.S. patent application Ser. No. 10/044,603, entitled, "Content and Display Device Dependent Creation of Smaller Representations of Images" filed Jan. 11, 2002, assigned to the corporate assignee of the present invention, and the header data can be used to determine document properties as in the U.S. patent application Ser. No. 10/044,420, entitled, "Header-based processing of images compressed using multi-scale transforms," filed Jan. 10, 2002, assigned to the corporate assignee of the present invention. If the document is stored in a object based format, then additional techniques are needed to create a bit-allocation map, but some alternative information is available.

Figure 2:
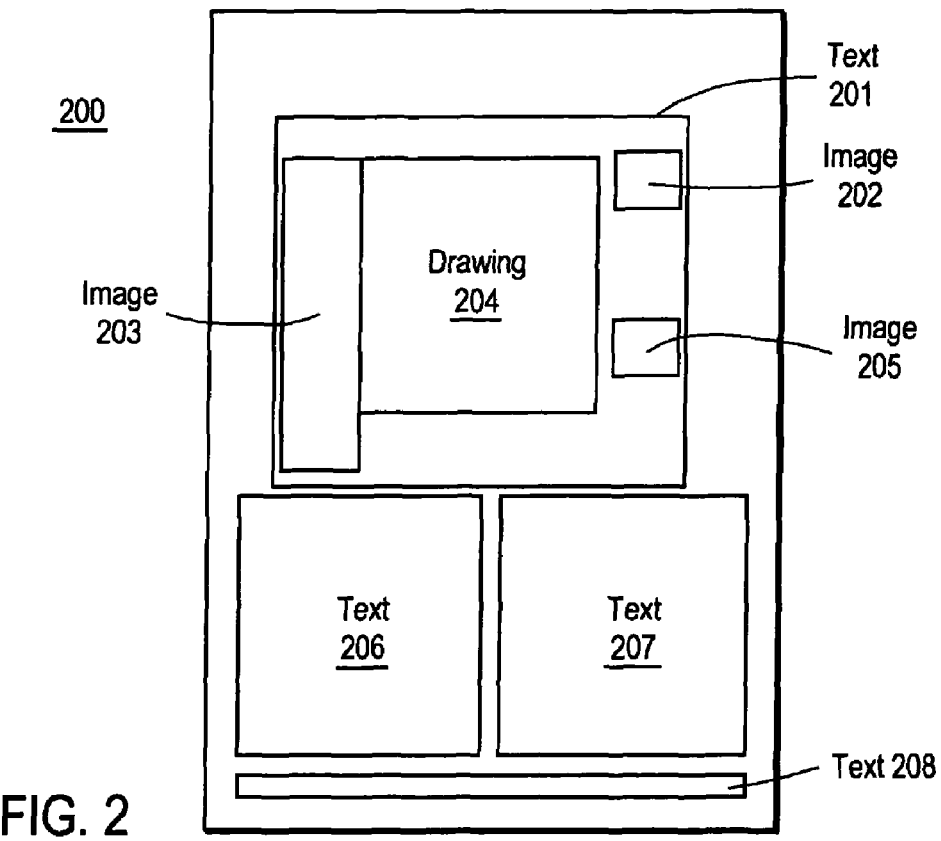
FIG. 2 is an image representation of a page of a document where regions are identified by the class of information.

FIG. 2 is an image representation for such a document. Referring to FIG. 2, document page 200 contain a set of objects 201-208 that includes text objects 201, 206, 207 and 208, image objects 202, 203 and 205, and an object 204 that must be rendered with drawing commands. Objects 201-208 may be overlapped as shown in FIG. 2 where text object 201 is overlapping image objects 202, 203 and 205 and drawing object 204 in the upper half of the page.

There are many other ways the same image could be represented as objects, and some methods have object divisions, while others do not. For example, the image could be represented as one large JPEG 2000 file inside a JPM or PDF file. The way the image is represented may depend on the way the document was created and the processing steps before the file format was made. For example, the representation of a scanned document may be very different from an original converted from a word processing format, although both might use the same file format.

Figure 3:
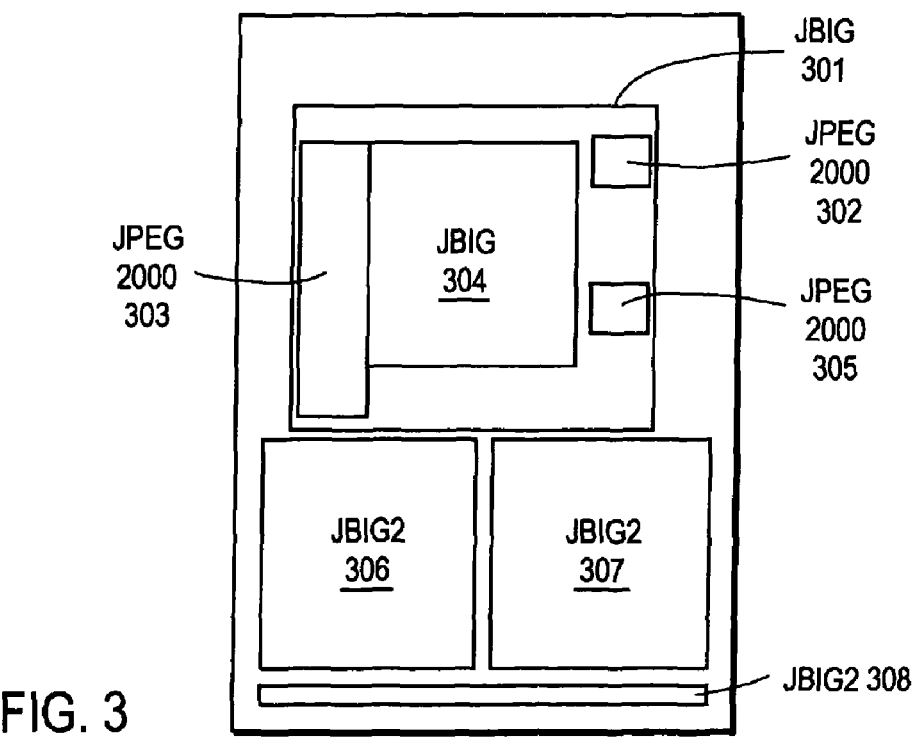
FIG. 3 illustrates an alternative representation to the classification representation of FIG. 2.

Depending on the file format used the objects may not be divided exactly into text, image, and drawing object types. For example, in the JPM format, objects are simply "masks" and "images" and the masks and images are compressed with some image compressor which might be JPEG, JPEG 2000, JBIG, JBIG2, G4 or other. Thus, the document from FIG. 2 when stored as a JPM file might appear as in FIG. 3, where the objects have been labeled by the type of compressor used. Typically, binary compressors like G4, JBIG, or JBIG2 are used to compress text or simple drawing commands. Continuous tone compressors like JPEG or JPEG 2000 are used to compress images or complex drawing commands with gradients. Referring to FIG. 3, JBIG objects 301 and 304, JBIG2 objects 306 and 307 and 308, and JPEG 2000 objects 302, 303 and 305 correspond to text objects 201, 206, 207 and 208, image objects 202, 203 and 205, and drawing object 204, respectively, of FIG. 2.

In one embodiment, the compression type and the object locations are determined from the header data of the JPM file without decoding any of the codestreams. Thus, typically one percent of the entire file can be used to determine the type and location of objects.

Figure 4:
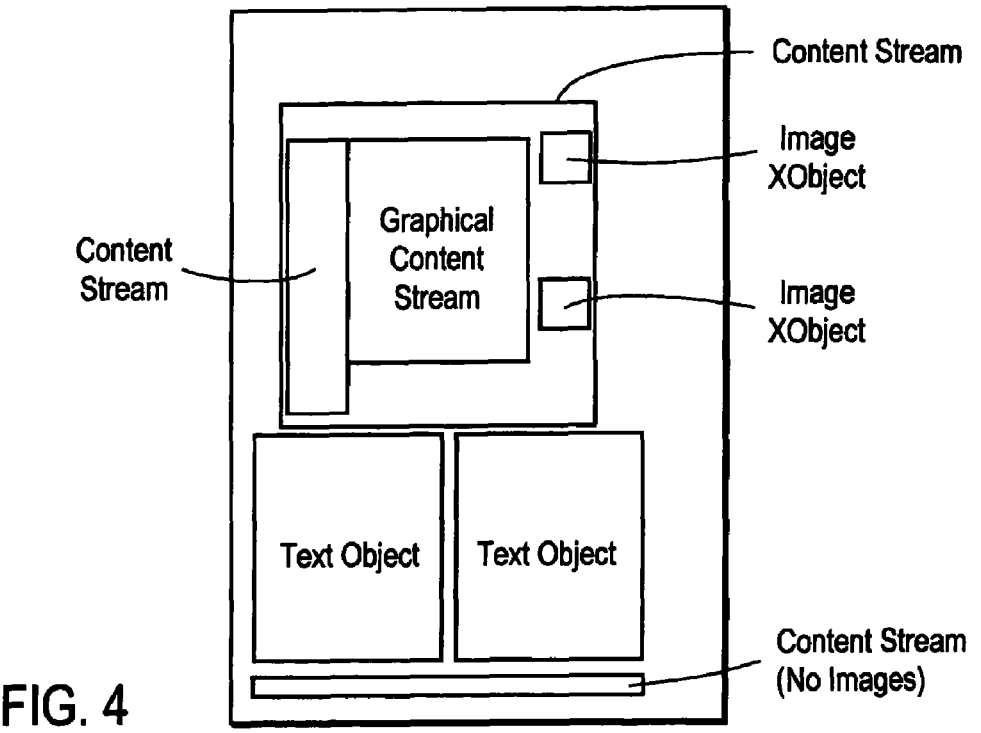
FIG. 4 illustrates another alternative representation to the image representation of FIG. 2.

Alternatively, the objects from the image in FIG. 2 might be stored in a PDF file as shown in FIG. 4. In PDF, all of the objects drawn on a page are referenced through the content stream for the entire page. Therefore, some drawing and text commands might not be localized to specific regions on the page, but simply known to be somewhere on the page. However, more structured PDF files may have clear bounding boxes for each object on the page. This is especially true for PDF files made up of "COGs" as described in Bagley et. al, "Creating Reusable Well-structured PDF as a Sequence of Component Object Graphic (COG) Elements," in Proceedings of the ACM Symposium on Document Engineering (DocEng '03), p. 58-67, ACM Press, 20-22 Nov. 2003.

When bounding boxes are available for each object it is possible to make a description of the objects as shown in FIG. 4. In PDF, it is possible to know not only that an object is text, but also the font information for the text. It is also possible to distinguish between drawing commands and raster images. Raster images can be stored in a variety of ways including JP2 and JPX images (both specific JPEG 2000 file formats), JPEG, JBIG2, G4, and many others including imagery compressed with generic stream compressors like Flate (which is also used for non-image data). Regardless of the source of information about the objects, it is possible to combine all the information into a variety of maps. One such map is a "bit-allocation" map. In one embodiment, the bit-allocation map indicates the average number of bytes used in the source file to represent a given region on the page.

Figure 5:
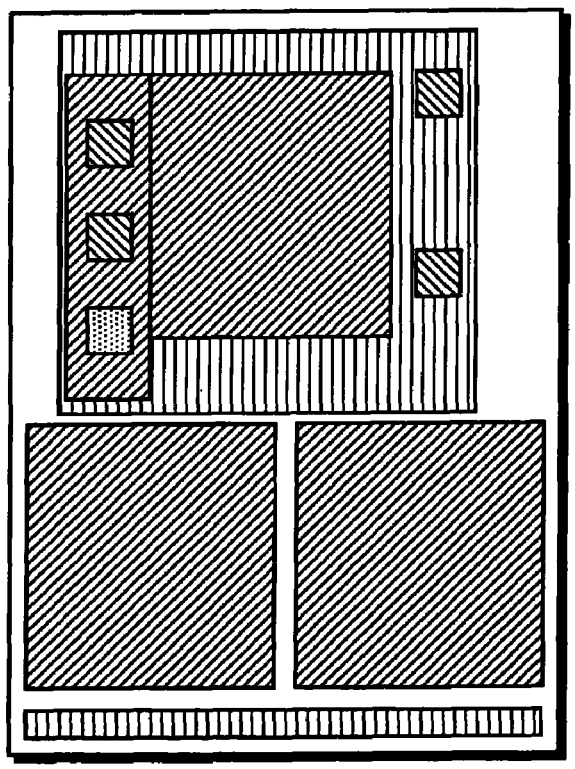
FIG. 5 shows an example of a bit allocation map for the document in FIG. 2.

FIG. 5 shows an example of a bit allocation map for the document in FIG. 2 where the different cross-hatching indicates a different number of bits per unit area. In one embodiment, the bit allocation map is generated from the header information in a JPM file by adding the number of bytes used for each object. For example, if a JBIG codestream is 2000 bytes and covers a region of 20,000 pixels, then it makes an average contribution of 0.1 bytes per pixel. If some of the pixels are also in a region with another object, average bytes from that object can be added. For a JPEG 2000 codestream, it is possible to localize the number of bytes to a smaller region than the whole object. As explained in U.S. patent application Ser. No. 10/044,603, entitled, "Content and Display Device Dependent Creation of Smaller Representations of Images" filed Jan. 11, 2002, assigned to the corporate assignee of the present invention, with a JPEG 2000 codestream, it is possible to determine the number of bytes for each codeblock. The region of the page affected by the codeblock can be determined and the bytes from that codeblock added only to the pixels in that region. As is visible from the upper left region of FIG. 5, one object can lead to different bit-allocations for different pixels, because the bytes in a JPEG 2000 codestream can be localized. Thus, there are 3 regions of the one object where more bytes have been used in FIG. 5, and those regions are the more active parts of the original document.

Because image compressors obtain different compression ratios even on the same data, simple addition of the "bits per pixel" for a region may not lead to a sufficiently accurate "activity" map of the image. For example, if an object was compressed with JPEG instead of JPEG 2000, the JPEG codestream might have 10 or 20% more bytes even though the visual impact was the same. Likewise, for some applications, binary regions may be more important than indicated by the number of bytes. Thus, it is useful to adjust the bit allocation map which would be obtained by simple addition of bits per pixel from different compression types. In one embodiment, because text regions are compressed with a binary compressor such as, for example, G4, or JBIG, the bytes for these compressors are weighted more heavily. Thus, when creating the bit-allocation map, it is useful to weight the bit allocation by a different amount depending on the compressor. For example, JPEG codestreams might be weighted by 1, JPEG 2000 codestreams by 1.2, G4 codestreams by 1.5, and JBIG codestreams by 2.5 for a particular application.

Note that there is often no need to compute the bit-allocation maps at the full resolution of a page. Because the number of bytes for a codestream is being spread equally over the region affected by the codestream, the approximation is only accurate at low resolutions. In addition, processing is much faster to determine a low resolution bit-allocation map.

Figure 6:
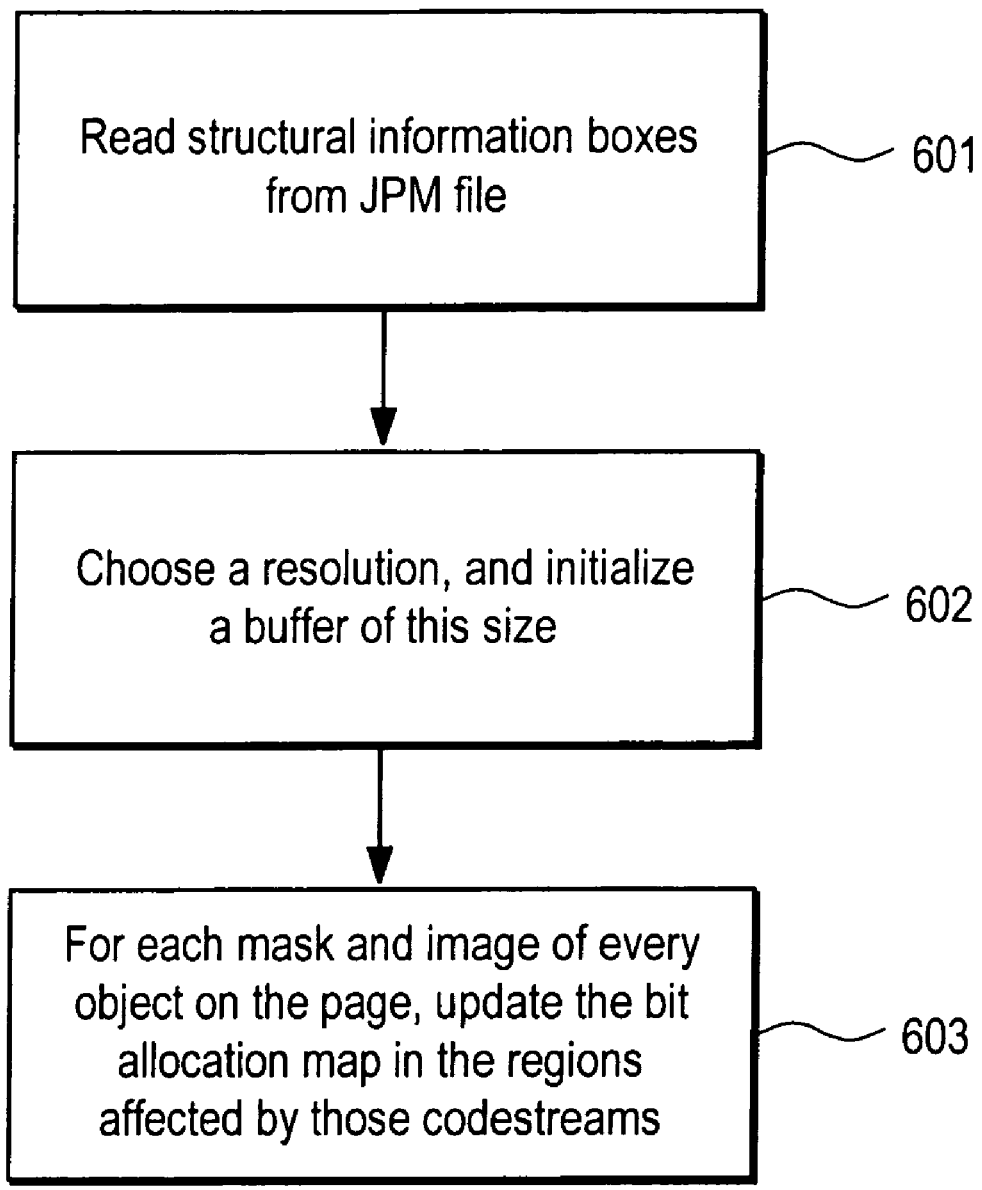
FIG. 6 is a flow diagram of one embodiment of a process for making a bit-allocation map from a JPM file.

FIG. 6 is a flow diagram of one embodiment of a process for making a bit-allocation map from a JPM file. The process is performed by processing logic that may comprise hardware (circuitry, dedicated logic, etc.), software (such as is run on a general purpose computer system or a dedicated machine), or a combination of both.

Referring to FIG. 6, the process begins by processing logic reading structural information boxes from a JPM file (processing block 601). After reading the structural information boxes, processing logic chooses a resolution and initializes a buffer of this size (processing block 602) to serve as the bit allocation buffer. Afterwards, processing logic updates the bit allocation map in the regions affected by those codestreams for each mask and image of every object on the page (processing block 603).

In one embodiment, these bit-allocation maps are used with selection algorithms in order to generate small sized representations of JPM or PDF files. They can also be used for classification. For example, a two column document can be distinguished from a one column document based on histograms of the bit allocation data without decoding the codestreams. For more information, see U.S. patent application Ser. No. 10/705,544, entitled "Features for Retrieval and Similarity Matching of Documents From the JPEG 2000-Compressed Domain, filed Nov. 10, 2003 and assigned to the corporate assignee of the present invention.

In one embodiment, in addition to the bit-allocation maps, the fact that one region of the document was compressed with JBIG while a different region was compressed with JPEG 2000 is used for classification or interactive delivery. A map of the object type used at each location on the page is made without even determining the lengths of the codestream. Each pixel of such a type map might be set to either the type of compressor that was used for that pixel, or to a "multi-compressor" type if more than one compressor was used, or to the type of the codestream that comes last in rendering order.

JPM, PDF, and other file formats may contain metadata which can also be used for bit allocation or classification maps. In the case of JPM, since there are no font rendering commands, a common form of metadata will be the symbolic text, which could be generated electronically or by an Optical Character Recognition (OCR) program. This information can be used for classification and networked delivery. If the metadata is associated with a bounding box within the page, the data can be used to make a "type" map, just as in the case of the compression type map. If the meta-data is associated with a JPM object, then the bounding box for that object can be used for the meta-data as well.

Information always available in a JPM file includes: Page width, Page height, Compression type, Bounding box (Horizontal offset of the object, Vertical offset of the object, Object width, Object height), Rendering Order, Codestream length, Layout object number, Object type (mask or image or both), NoCodestream flag, Data reference number, and the Offset of the corresponding codestream box from the beginning of a file. Page width and Page height are stored in the Page Header box inside the Page Box for a JPM file. The bounding box is provided by the Layout object height and width and the offsets from the top and left of the page: "LHeight", "LWidth", "LVoff" and "LHoff" stored in the Layout Object Header box in the Layout Object Box in the Page Box in the JPM file. The Layout Object Header box also indicates whether or not a layout object has an "image" a "mask" or both. The rendering order for objects is determined from the order of the Layout Object Boxes within the Page Box. This order is also given by the "LObjID" which is an ID number for each layout object. Codestreams can be stored either as "contiguous codestreams" or as multiple fragments. In the case of contiguous codestreams, the length is given by the "LEN" field of the Object Header Box, and the position of the codestream is given by the "OFF" field of the same box. For fragmented codestreams, the "LEN" field is the length of a fragment table, to determine the actual length of the codestream the Fragment table box pointed to by the "OFF" field, is accessed and the length is the sum of the "LEN" fields in the Fragment List boxes inside the Fragment Table Box. The location of the codestream in this case is multiple locations as specified by the "OFF" fields of the Fragment List boxes.

In some cases, the codestream may be stored in a different file than the header information. This is indicated by the use of a nonzero Data Reference value, and the location is specified by the Data Reference Box.

The compression type for objects is stored in the Image Header box in the JP2 Header box in the Object box, when a codestream is associated with an object. Because an encoder uses a particular compressor for each object, the compression type is often related to the type of information stored. Thus, the compression type can be used to make a bit allocation or type map of the page. The number of components and the bits used for each component are also stored in the Image Header box and can be used for the same purpose. The JP2 Header box may also contain a Bits Per Component box or a Colour Specification box in which case information like the color space could also be used to affect a type or bit allocation map. However, the "Bits Per Component" or "Colour Specification" information is not always present and, thus, in such a case, an application has other means to determine needed information.

Some objects in the JPM file do not contain codestreams. This is indicated by the "NoCodestream" flag in the Object Header box. In this case, there are no bytes in a codestream for a bit allocation map and only the bytes from the mask or image part of the object contribute to the bit allocation map. If neither the mask nor the image have a codestream, then the object is a rectangle of solid color. Some small number of bytes could be arbitrarily used in this case in a bit allocation map. In a "type" map, this could be a special type, since it corresponds to a very simple object, or it might be combined with one of the other available types.

Some files contain information in addition to the instructions needed to render a page. In a JPM file this information can be stored in a XML box, very simple information might be stored in a Label box, information could be stored in a Media Data box, or a UUID box. One common item to store is the result from running an Optical Character Recognition (OCR) program. This is especially common for scanned imagery. The OCR results typically contain a symbolic representation for text on a page along with a location for that information. OCR results sometimes contain additional information such as bounding boxes for paragraphs, lines, words or even characters of text or imagery. For text regions sometimes the OCR information includes information about the font e.g. the name or the size. The OCR results could be used in addition to codestream lengths in both the bit allocation and type maps. In the bit allocation map, additions could be made based on the region described by the OCR. For example, a large font might indicate importance beyond the number of bits required to store the codestream needed to render a large font, thus the bit-allocation map could be adjusted upwards in these regions.

Figure 18:
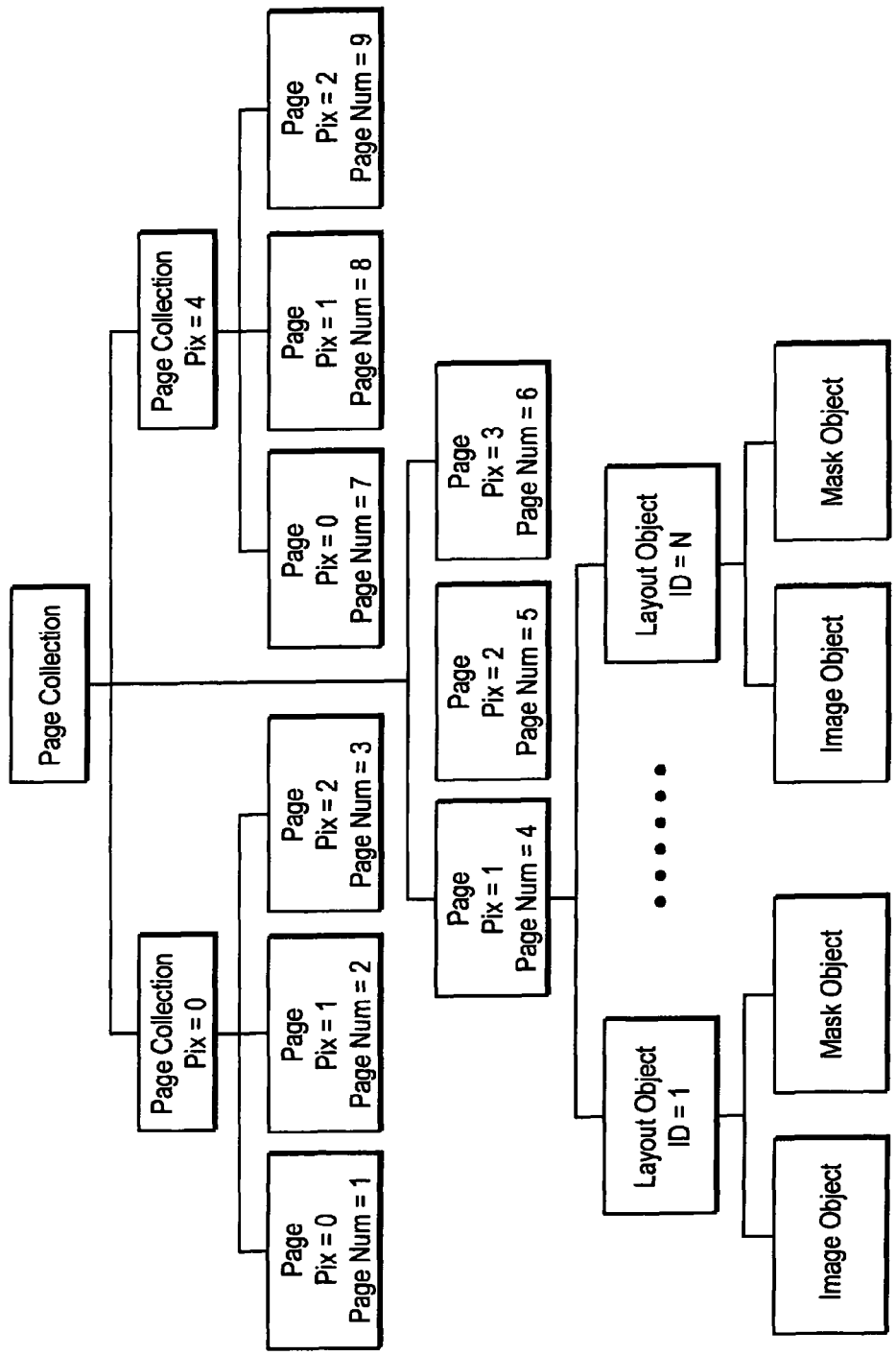
FIG. 18 illustrates a Page Collection tree with added page numbers.

JPM files do not contain explicit page numbers by default. Although that information could be added in a metadata box (e.g., XML box, Label box, or UUID box), in one embodiment, the page number is determined by walking the Page Collection tree, in a depth first order and incrementing page numbers as Page Boxes are encountered. A Page Collection tree with added page numbers is shown in FIG. 18. Once page numbers are determined, either by tree walking or from metadata, they may be used to change the importance of objects based on the page. For example, early pages in a document might be given more importance and thus higher values in a bit allocation map.

In one embodiment, an indication of the distortion to a reconstructed page that would occur if an object was skipped in the rendering process is used in ranking objects. JPM files do not contain such an indication in the boxes used for decoding the page image, nor do typical encoders produce such information. Information about the distortion or even "visual impact" of an object on a page may be stored in one of the metadata boxes of the JPM file. A simple item to store is the change in the mean squared error that occurs if an object is not rendered. In one embodiment, such a value is determined or estimated when the file is created, by, for example, measuring the squared difference of an object from the background when it is compressed. Alternatively, information is determined after the initial creation of the file by decoding the codestreams and calculating their impact. A better estimate will take into account overlap between objects. Obviously, an object has less visual impact if it is obscured by another object. A distortion caused by a missing object could also be determined by image analysis methods that determine document structure, and the "edit distance" or difference between the structures with and without the object can be computed.

In a PDF file, the location of PDF objects is provided by a "Cross Reference section" which can be located by reading the last portion of a PDF file. The PDF objects are structures for storing data or instructions. This is different from other "objects" discussed herein that are typically visually significant portions which often correspond to a codestream or set of instructions in the file. Codestreams are stored in PDF stream objects. The streams have a dictionary associated with them that indicates the filter. Each compression type is indicated by the use of a particular "filter" or decoder on the stream. For example, the "JPXDecode" filter is used with streams containing JPEG 2000 codestreams, the "DCTDecode" filter is jused for JPEG baseline codestreams, and the "JBIG2Decode" filter is used for JBIG2 codestreams.

In the case of using a JPEG 2000 codestream with PDF image Xobjects, Width and Height may be obtained from the image dictionary. In addition the colorspace may be present in the image dictionary in which case the colorspace inside the JPEG 2000 file is ignored. Additional information, e.g. the quantization table, may require reading the header of the codestream in the stream, but can be obtained without decoding the entropy encoded data. Information about the placement of the compressed codestreams on a page comes from the content stream for the page. Keywords might be obtained from "hidden text," which is part of a page content stream but is not displayed.

Classification information could be obtained in a PDF file from Marked Content in the content stream for the page. Marked content is not required, but could be used by a variety of applications to indicate that the marked commands have some feature, for example that they were added in a particular revision, or correspond to some external data-base entries. The spatial extent of an image being rendered from a PDF file depends on the "current transform matrix" which can be set in the content stream for the page. Thus, the generation of the bit-allocation matrices may require parsing the content streams and determining the transforms that apply before an image is drawn.

Object Rankings

Objects are ranked based on some kind of quality or importance. If the quality of a received or displayed document or partial document depends on which objects are available, then the quality can be determined for individual objects. This quality can depend on both properties of the object and properties about the objects role in the document. In one embodiment, quality is determined for individual image objects or codestreams. This quality may be determined from information that has been previously stored or from features of the object that can be extracted without fully decoding the codestreams. In one embodiment, the quality is estimated from available header information. The quality could be estimated in other ways.

In many cases, in addition to the quality contribution for an object, there is a cost for including the object. The most typical costs are the file size or the transmission time, which are both directly related to the size of the codestreams. In one embodiment, the cost includes the space filled by the object when rendered. In another embodiment, the cost includes the complexity of decoding an object, which is related to the length of the codestream, but may be strongly influenced by the type of compressor used, and the options used within the compressor. For applications where the quality of objects is somewhat independent of other objects, and the cost of inclusion is also additive, objects may be ranked in the order that increases, and potentially maximizes, the quality per increment in cost. The quality that an object adds to an image is given by the quality of the image with that object, minus the quality of the image without that object. This additional quality for an object i, is called $\Delta Q_i$. In a networked delivery system, an object begins transmission at one time and finishes later, the difference between these times is the cost to transmit the object, and is called $\Delta t_i$. This leads to a rank of object i, $O_i$, being the change in the rendered image quality divided by the transmission time:

$$\mathrm{Rank}(O_i)=\Delta Q_i/\Delta t_i$$

Note that "Rank" here is not an integer ordering (1st, 2nd, 3rd), but rather a measure of importance where higher ranks are more important. Thus, typically the object with the highest rank will be transmitted first.

Figure 7:
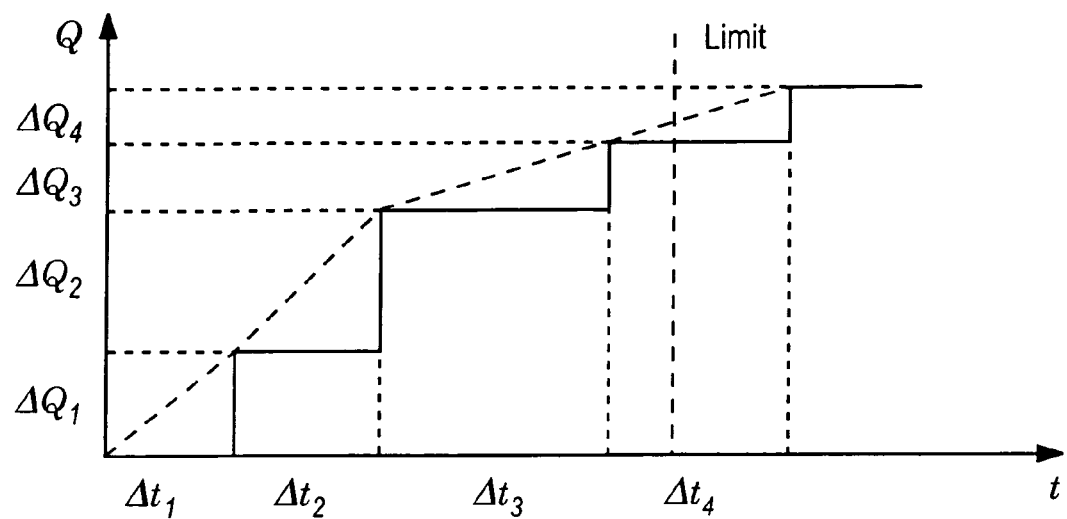
FIG. 7 shows a set of four objects ordered in terms of maximum quality per unit time.

FIG. 7 shows a set of four objects ordered in terms of maximum quality per unit time, and the resulting quality achieved at any point in time. As shown in FIG. 7, the transmission time and quality added by each of the four objects is shown. Note that the quality may not be constant for an object; it may change depending on the application and the current task of an application. For example, the quality that an object adds to a document may depend on which page is being examined. If the object is not on the current page, it may have no impact on quality.

Rankings or quality measures for each object in a document file, such as a JPM or PDF file, are used to select objects for inclusion in a new file or transmission. When a client-server relationship is considered where the client indicates a particular view-port that is of interest, objects are ranked with respect to the viewport. In such a case, in one embodiment, a ranking is based on the overlapped area with the view port. In another embodiment, a more complex ranking uses the mean square error (MSE) weighted over the overlapped area, where the "error" is the difference between fully rendering a document and the best rendering without the object.

In one embodiment, object ranks are determined in real time. In this case, object features are defined that do not require decoding codestreams. Instead, the object information is extracted from the JPM file header and possibly some auxiliary information files that have been previously constructed. All of the previously mentioned object features could be used to rank the objects, including: Object compression type, Bounding box, Rendering Order, Codestream length, and MSE estimates.

There are several choices for the quality measure. In one embodiment, text readability and bit distribution are used as indicators of quality. In another embodiment, the intersection with the view window is used. Other quality measures may be used including, but not limited to: overlapped area between object and view port, MSE or JND (Just noticeable difference) value computed and stored in the auxiliary "info" file, and the object's closeness to the current view port.

In one embodiment, image object ranking is based on one or more of: request window location, request window history, or full request history, device characteristics (including computational or memory limits), bit allocation matrices, object reading order, and/or metadata stored in JPM file, information in a server hints file, overlap of objects, compression type of object, search terms, heuristics or estimates of relative importance of contone, binary, and drawing commands.

Object Ranking by Overlap with the View-Port

Figure 8:
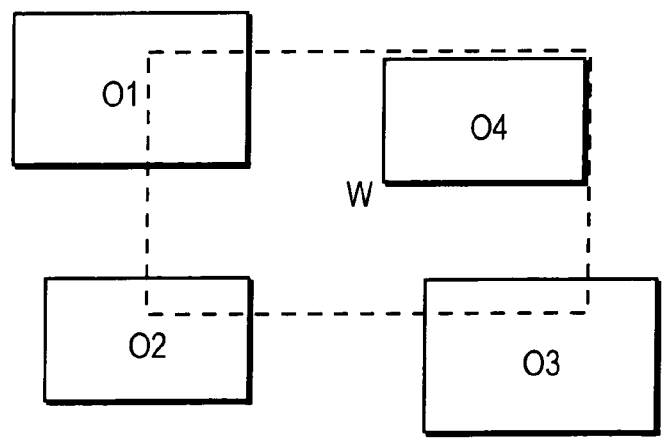
FIG. 8 shows partial overlap for three objects and a complete overlap with a user window for a fourth.

Given a document image which is made up of a set of objects, $D=\{O_i | i=1, 2, \ldots N\}$ and a view port, or request window, W, where $O_i$ represents the ith object (image, mask or both) in the document, a quality measure Q for each object is found, which is a function of the object, selected features, and the view window. The view window may be the set of pages that are of interest, a spatial region on the screen, or some combination. In one embodiment, if the quality of an object equates to its ability to contribute to filling the display, the quality measure can be set to the overlapped area between the object and the view-port. Thus, a simple ranking equation can be rewritten as $$\text{Rank}(O_i) = \frac{\text{Area}(O_i \cap W)}{\Delta t_i}$$

where Area( ) denotes the overlapped area between object $O_i$ and view-port W. $\Delta t$ can be the expected transmission time, an expected time to run a decompressor on the object, or the number of bytes in the codestream, or any other cost associated with the codestream, even a constant (it need not be related to time). This function depends on the window or viewport and could also be called Rank($O_i$, W). FIG. 8 shows a request window, W, a completely contained object, $O_4$, and three overlapping objects, $O_1$, $O_2$, and $O_3$, partial overlap for three objects and a complete overlap of the view-port and the object for a fourth.

MSE-weighted Object Ranking

In another embodiment, the mean square error (MSE) measure of each object is used as the quality measure. For example, for a document D containing object set $\{O_i | i=1, 2, \ldots N\}$, in one embodiment, the MSE measure of object $O_i$ is calculated in the pixel domain as follows:

$$d_{O_i} = MSE(D, D - \{O_i\})$$

where $D - \{O_i\}$ denotes the document with object $O_i$ removed. This enables a ranking function to be expressed as follows:

$$\text{Rank}(O_i, W) = \frac{d_{O_i} \text{Area}(O_i \cap W)}{\Delta t_i \text{Area}(O_i)}$$

The equation above scales the MSE of object $O_i$ by the overlapped area, since only the part inside the view port is of client's interest.

Keyword Ranking, Area of Interest for Viewing, Reading Order, and Obscuring Data In one embodiment, in network access to a JPM document, the client provides keywords to specify his interest of certain content in the document. Keyword can be used in deciding the delivery order (i.e. rank) of the objects.

In one embodiment, the view port is used to identify specific metadata within a file. For example, some metadata may be associated only with specific objects. The rank of an object is increased (or decreased) if a particular kind of metadata is associated with the object.

In one embodiment, reading order and object layout information is used in ranking the object.

JPM supports mixed raster contents. Sometimes an object is rendered to the same spatial region as a previous object. Depending on the mask of the object rendered later, the earlier object may not be seen on the display. This factor can be used in object rank. For example, the rank of an object is decreased if another object obscures some or all of its area.

Metadata

JPM provides an optional metadata box and label box for each object. During the encoding process, information can be added for an object (e.g. the note or tag). In one embodiment, that information is used in keyword search or more structured search to determine the client interest. For example, in a map document, a hot spot could be associated with the longitude and latitude information. When the client requests a particular window, the server could respond with longitude and latitude, of the hot spots inside that range.

Other possibilities include: windows that intersect with multiple pages of multi-page documents; objects "close to" the current view window; MSE computed and stored as metadata; and approximations of MSE (e.g., an area of document and average color).

In the multi-object compressed files, the quality measure may contain some notion of overlap.

Mask Ranking

In some applications, it is desirable to set the rank of mask object higher than the image object. The reason is that if the mask object is first delivered, the layout object may be rendered before all of the image object data is received. For example, if the image data is encoded by JPEG 2000 with progressive mode, partial image can be rendered on the screen while more data is coming. Since text type information often is contained in the mask, this has the benefit of allowing text to appear sooner. Furthermore, if the image data is encoded by JPEG 2000, a lower resolution image can be first displayed to reduce the waiting time of the client.

Object Selection

Object selection is controlled based on one or more limits. There are a number of possible limits. In one embodiment, image objects may be selected based on their ranking until the canvas was filled. In another embodiment, tile-parts are selected until all objects in the view window are delivered or a new request is received from the client. In yet another embodiment, objects are selected and delivered based on their ranking until some computational limit has been reached (estimating the amount of computation required to decode each object), or until some maximum number of bytes has been transmitted or stored, or some combination of limits has been reached. In some cases, it may be possible to include all objects which meet a particular criteria before the limit is reached. An example criteria is including an object needed to render a low resolution version of a page.

In one embodiment, a different limit is associated with each object. For example, in a video stream, objects must be delivered by the time they need to be shown, and thus there is more time available to deliver objects in later frames of video.

Although much of the ranking discussion above is based on the importance of an object on a page, the cost is usually a function of the codestream delivery or decoding. If a codestream is used for only one object, then object ranking and codestream ranking is equivalent. If, however, a codestream is used for multiple objects, then it's ranking may be higher than if it is just used for one object. If a codestream is used for multiple objects but only one of those objects is of interest, then the rank of the codestream should probably not be increased. Thus, in one embodiment, when performing ranking, all objects are ranked, and this rank is associated with the underlying codestreams. If a codestream receives multiple ranks, then they should be combined in order to determine the importance of the codestream relative to other codestreams. In one embodiment, a ranking based solely on reading order, only the more important rank applies. In another embodiment, for example, a MSE-based ranking, the two ranks could be added together, because if the codestream is not provided both objects will suffer.

Applications

Extract and Rank for Networked Delivery

It is possible to use the extract and rank framework described herein for higher quality image delivery over a network. In one embodiment, at the server, all objects that intersect the view window can be ranked using one of the previously mentioned ranking functions. Then, the codestreams can be delivered in the order that maximizes the quality until the client indicates a different view window is active, or all objects intersecting the window have been delivered.

If one of the codestreams in a container file is a JPEG 2000 file, then portions of that codestream may be ranked independently and treated as separate objects. For example, each tile part in a JPEG 2000 file could be given a rank along with each whole JBIG2 codestream in a file. JPIP can be used to deliver the tile-parts of the JPEG 2000 codestreams and complete JBIG2 codestreams in the best order.

Figure 12:
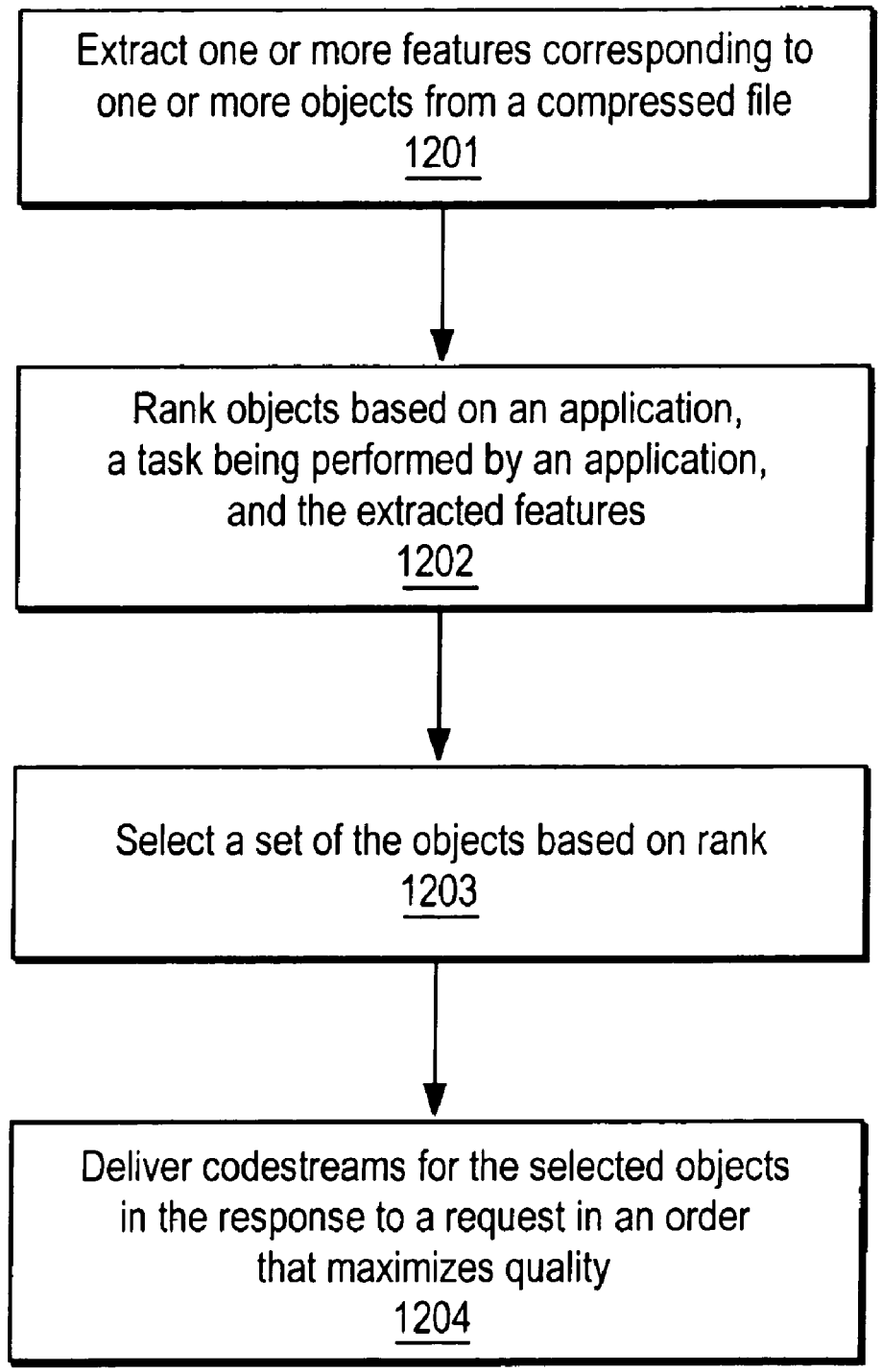
FIG. 12 is a flow diagram of one embodiment of a process for performing network delivery of an image.

FIG. 12 is a flow diagram of one embodiment of a process for performing network delivery of an image. The process is performed by processing logic that may comprise hardware (circuitry, dedicated logic, etc.), software (such as is run on a general purpose computer system or a dedicated machine), or a combination of both.

Referring to FIG. 12, the process begins by processing logic extracting one or more features corresponding to one or more objects from a compressed file (processing block 1201). In one embodiment, one or more of these features are extracted without decoding. After feature extraction, processing logic ranks objects based on an application, a task being performed by an application, and the extracted features (processing block 1202). Once ranking has been completed, processing logic selects a set of the document objects based on rank (processing block 1203). Then, processing logic delivers codestreams for the selected objects in response to a request in an order that maximizes quality (processing block 1204). This delivery occurs until a different view window is active or all objects intersecting a view window have been delivered.

Prefetching for Interactive Image Browsing

Figure 9:
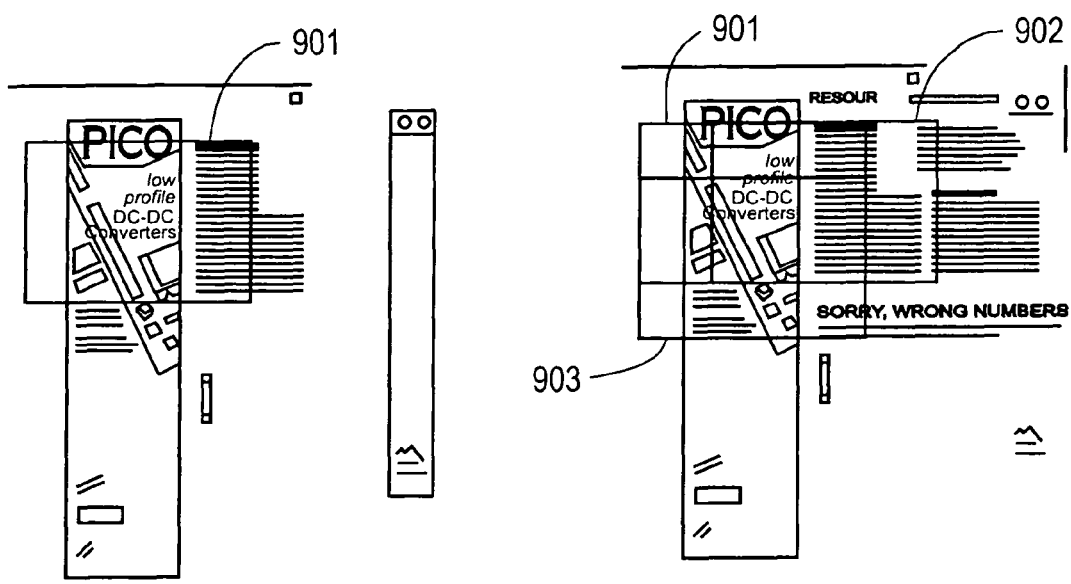
FIG. 9 shows the data available at a client when browsing a document image stored as a JPM file with and without prefetching.

In general, "prefetch" refers to providing data that has not been explicitly or implicitly requested. In a client-server environment, prefetching hides latency because if data is requested that was already prefetched, there is no network delay to obtain the data. In order to have a system with prefetching using JPIP, the client should indicate an ability to receive data other than the requested data, the server should rank objects beyond those that would satisfy the request, the server should send additional objects beyond those that would satisfy the request, and the client should make use of any data that has arrived if it become useful for the user, without waiting for the response to a new request. In many systems, some of these actions happen without additional implementation. For example, a client is very likely to render an image with all available data when a user makes a change of window at the same time a new request is issued to the server. If the client has stored the "prefetched" data with other received data, then it will automatically be used in a "preview." FIG. 9 shows the data available at a client when browsing a document image stored as a JPM file with and without prefetching. Region 901 is the current view window and is all that is displayed on the client's screen. In both cases, all data for the current window has been received. With prefetching, potential future windows, shown as regions 902 and 903 are determined and data associated with those windows can be delivered to the client. Thereafter, when the client requests a new window, the requested data is likely to available without an additional request to the server.

In a client-server connection, when the server serves a sequence of requests from the client, there is often some interval between delivery of all the needed data and receiving the next request. For example, the user of the client may spend some time in viewing the delivered content. The channel is idle during this interval. The server could continue to send more data to the client, expecting that the client will use it in the near future. Then a newly requested object can be fetched from the local cache instead of traveling through the network, which will save the user of the client waiting time especially if there is a limited bandwidth connection to the server (e.g. a wireless connection or dialup). When the server delivers the prefetching data, it also needs to decide the order of delivery for the objects that do not intersect with the current view port. The object prefetching problem can be solved as a ranking problem. In one embodiment, a prediction is made as to the next view port and the objects are ranked with that view port. In another embodiment, an assumption is made as to a locality property and the closeness between the objects and the current view port is measured.

A Prefetching Approach

A client graphical user interface (GUI) may only support limited panning and zooming operations. For example, there may be buttons or other controls for panning left, right, up, down, zoom in, and zoom out. The buttons for panning in a particular direction each lead to a new view window of the same size. A probability $p_i$ can be associated with the view port $W_i$ for each direction. For an English language reading order, there is greater probability of movement to the right or down (unless the current view window is already at a page boundary). Using the object ranking approaches developed previously, the prefetching rank for object $O_j$ can be calculated as follows:

$$Rprefetch = \sum_i (p_i \text{ Rank } (O_j, W_i)).$$

This suggests that the prefetching rank is the expectation of the object rank with all possible next view ports.

Multiple-step Prediction

One-step view port prediction can be extended to multi-step prediction. For a predicted view port at the kth step, the next view port at (k+1)th step is constructed using six possible operations allowed by the GUI (i.e. left move, right move, upward move, downward move, zoom in, and zoom out). The system uses an assumption that the probability that the client will move k steps is $q_k$, and based on this assumption calculates a prefetching rank using:

$$Rprefetch = \sum_i (q_k p_i \text{ Rank } (O_j, W_i))$$

View Port Prediction Based on Previous Requests

Figure 10:
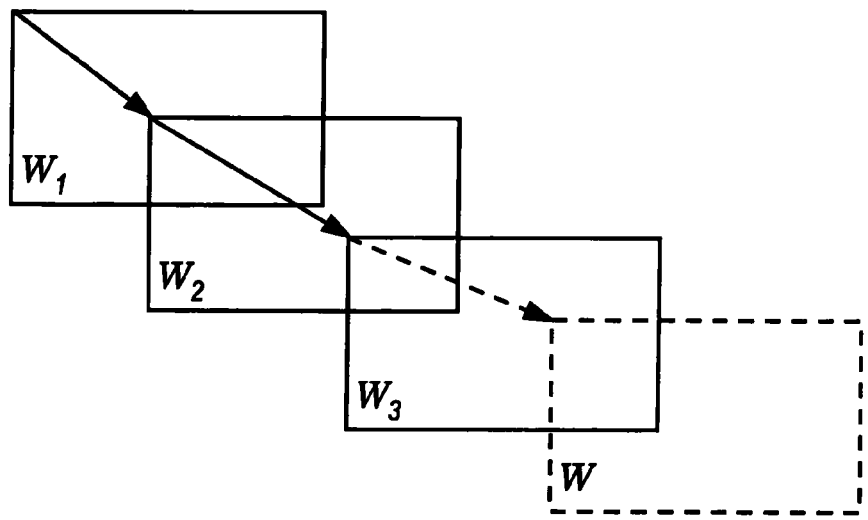
FIG. 10 shows an example of the next possible view port through extrapolation.

For a client-server connection, the server can keep the information of the previous requests on the same channel or connection or from the same client. The server can predict the next view port from the pervious view ports. For example, the system may use one or more extrapolation algorithms to determine the offset of the next view port from a sequence of offset points of the previous view ports. The height and width of the next view port can be calculated similarly. FIG. 10 shows an example of the next possible view port through extrapolation. Referring to FIG. 10, the motion of the next of window W may be made based on windows $W_1$, $W_2$, and $W_3$. The simplest prediction might be that the change from window $W_2$ to $W_3$ will be repeated from $W_3$ to the next window. A more advanced prediction might look at the change from $W_1$ to $W_2$ and from $W_2$ to $W_3$ and predict the acceleration of the window to predict a new window. These window predictions could also be modified by knowledge of boundaries of the document, or spots of interest, perhaps those viewed by other clients.

Another Prefetching Approach

Figure 11:
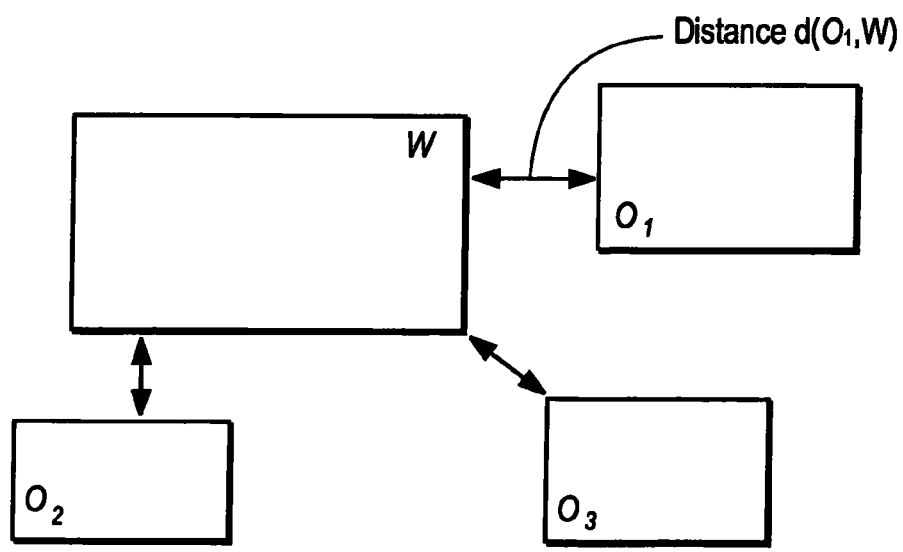
FIG. 11 shows the minimum distance between the objects and the view port when the object and the view port do not overlap.

For applications where requests are likely to be in the same spatial region, objects close to the current view port have a greater probability to be requested, and the object prefetching rank can be determined according to the distance, d, between each of those objects and the current view port. FIG. 11 shows the minimum distance between the object and the view port when the projection of the object and the view port overlaps horizontally, vertically or neither. Referring to FIG. 11, objects $O_1$, $O_2$, $O_3$ are shown in relation to window W. In one embodiment, the prefetching rank can be set to be the reciprocal of the distance.

$Rprefetch=1/d(O_j, W)$

Object Requested by Client vs. Prefetching Object

Normally, the server should first send those objects specifically requested by the client or implicitly requested because of the view window. Then, if there is more bandwidth or equivalently time, the server may send additional data referred to as prefetch data. Therefore, in one embodiment, in the ranking function, objects that intersect the view window are ranked higher than objects that should be sent because of a high prefetch ranking.

JPIP is often implemented over the HTTP 1.1 protocol, in which the client initializes the request and the server sends back the response. While ideally a single JPIP request could lead to multiple responses, first one with the explicitly requested data, then one with the "prefetched" data, this is not possible in HTTP. One solution is to append the prefetch data to the response to a request. Since the objects requested by the client have a higher rank than the prefetching objects, the server first delivers the requested objects. In one embodiment, the server terminates the sending of prefetch data when a new client request is received.

In JPIP responses, there is no explicit signal to allow the client to distinguish between requested data and the prefetch data. Thus, the client obtains data from the socket as long as there is some data coming.

The JPIP standard defines a preference parameter that takes multiple values. In one embodiment, this parameter is extended to allow a client to indicate a desire to receive prefetched data. For example the following JPIP request indicates prefetching is desired:
    jpip://example.com/image.jp2?fsiz=1024,104&rsiz=256, 256&pref=prefetch:1
In another embodiment, the extensions to the JPIP standard for vendor capability can be used to indicate a willingness to accept prefetch data:
    jpip://example.com/image.jp2?fsiz=102,1024&rsiz=256, 256&cap=vc.com.ricoh.crc.prefetch:1
Additional preferences or vendor capabilities could be defined to indicate which ranking function a server should use when prefetching data.

Figure 13:
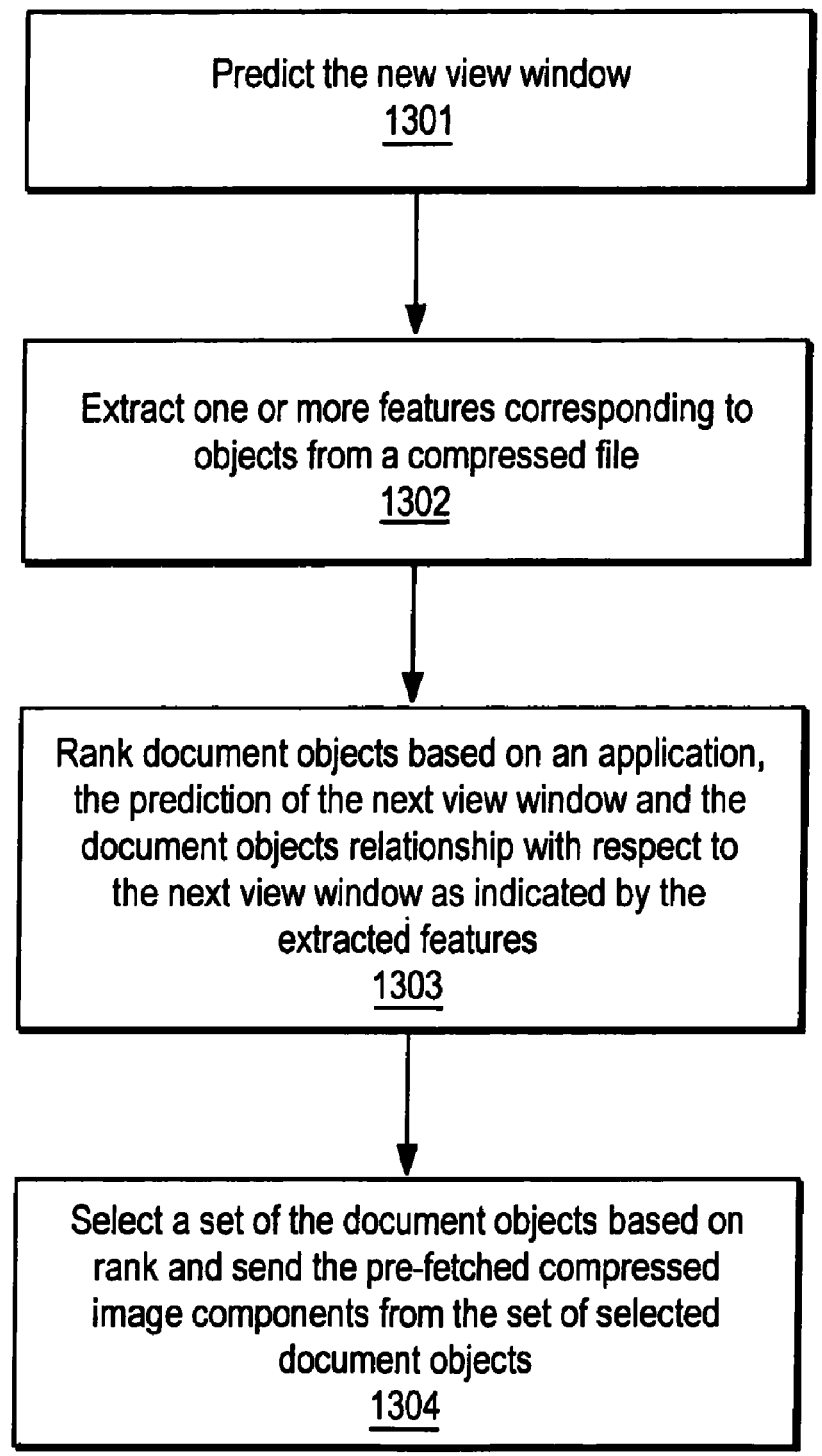
FIG. 13 is a flow diagram of one embodiment of a process for prefetching data.

FIG. 13 is a flow diagram of one embodiment of a process for prefetching data. The process is performed by processing logic that may comprise hardware (circuitry, dedicated logic, etc.), software (such as is run on a general purpose computer system or a dedicated machine), or a combination of both.

Referring to FIG. 13, the process begins by processing logic predicting the new view window (processing block 1301). Processing logic also extracts one or more features corresponding to objects from a compressed file (processing block 1302). In one embodiment, one or more of these features are extracted without decoding.

After feature extraction, processing logic ranks document objects based on an application, the prediction of the next view window and the document objects relationship with respect to the next view window as indicated by the extracted features (processing block 1303). In one embodiment, the document object's relationship with respect to the next view window comprises an object's closeness to the next view window. In one embodiment, the ranking the document object is based on the likelihood that each document object overlaps one of a plurality of potential new view ports. In another embodiment, the ranking the document object is based on a likelihood that each document object overlaps one of multiple potential sets of two or more view ports to be shown consecutively. In an alternative embodiment, ranking document objects is based on one or more previous view ports and the document objects relationship with respect to the next view window.

Once ranking has been completed, processing logic selects a set of the document objects based on rank and sends the pre-fetched compressed image components from the set of selected document objects (processing block 1304). In one embodiment, this may be accomplished by appending the one or more objects of prefetched data to a response.

JPM Parser

Figure 19:
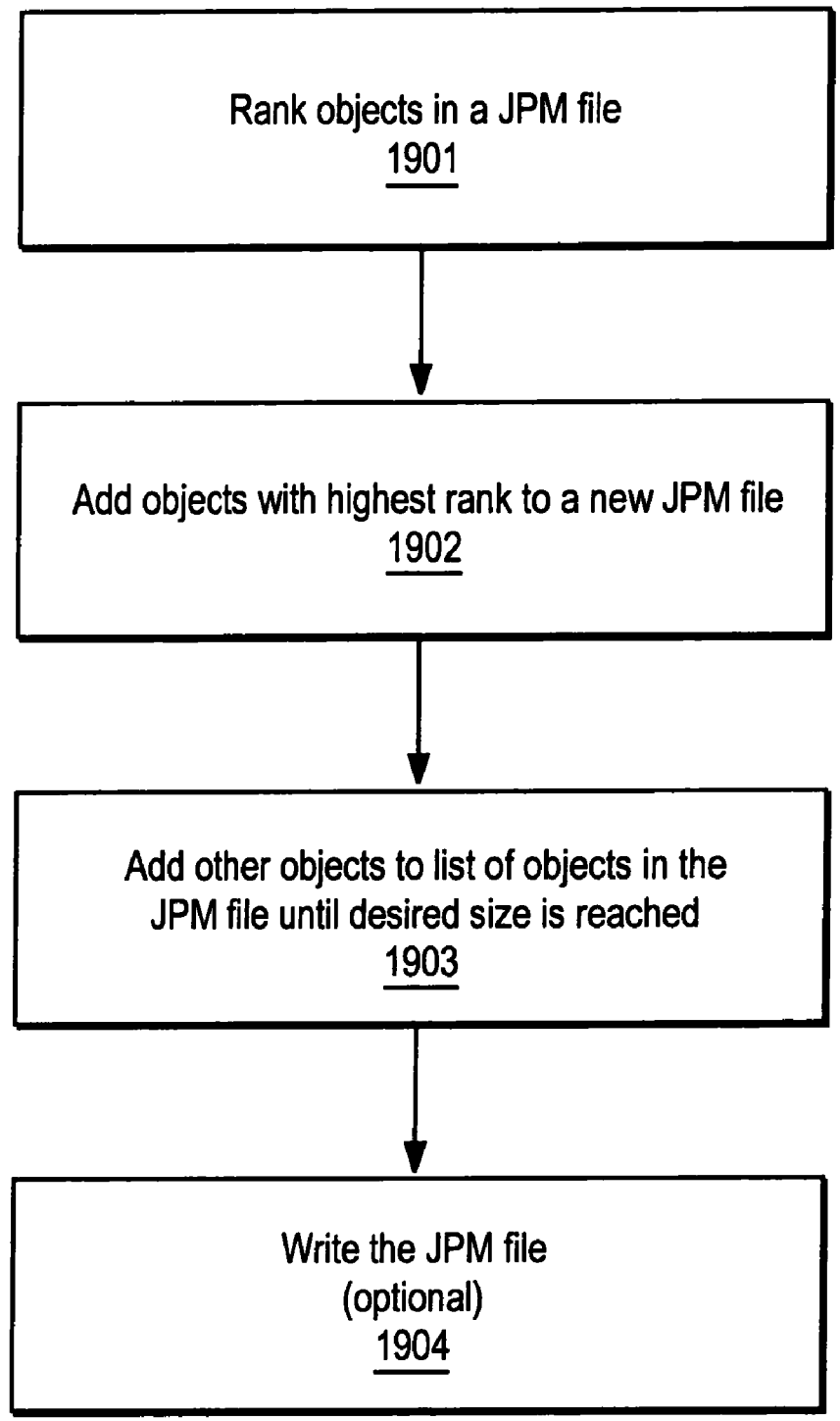
FIG. 19 is a flow diagram of one embodiment of a process for creating a JPM file.

In one embodiment, ranking and ordering are used to create new JPM files from old JPM files. This operation need not take place over a network. Indeed, a large high resolution file can be "parsed" by ranking objects in the JPM file based on visibility at low resolution. This ranking is especially valuable if it separately ranks the different resolutions in a JPEG 2000 codestream. Then objects can be selected to achieve a file of a predetermined size. Referring to FIG. 19, processing logic ranks all the objects in a JPM file (processing block 1901). The tile-parts of JPEG 2000 codestreams might be ranked differently with tile parts containing low resolution data, given a higher rank. Then processing logic includes the object with the highest rank in a new JPM file (processing block 1902). Processing logic adds other objects with the based on rank to the list of objects to include in the JPM file until the desired filesize is reached (processing block 1903). At this point, processing logic (optionally) writes the JPM file (processing block 1904). This new file will contain those objects most important for a low resolution display of the JPM file.

The ranking used in such a JPM parser can be any of the ranking functions discussed above. If there is no client, a view window can be chosen based on the application for the ranking functions that make use of a view window. A typical reason to parse a large file is to take a high resolution image that perhaps existed because of scanning a large document, and producing a screen or low resolution document that can easily be sent by email or displayed on small screens.

A JPM parser could be a program that analyzes a JPM file, then copies the needed information to a new file. A JPM parser can also be implemented by running both a JPIP client and a JPIP server on a single device, having the client make requests, and the server rank objects, and deliver them to the client. There may be a slight complexity inefficiency to this sort of implementation, but it allows the same software base to be used for both networked and local operations.

Figure 14:
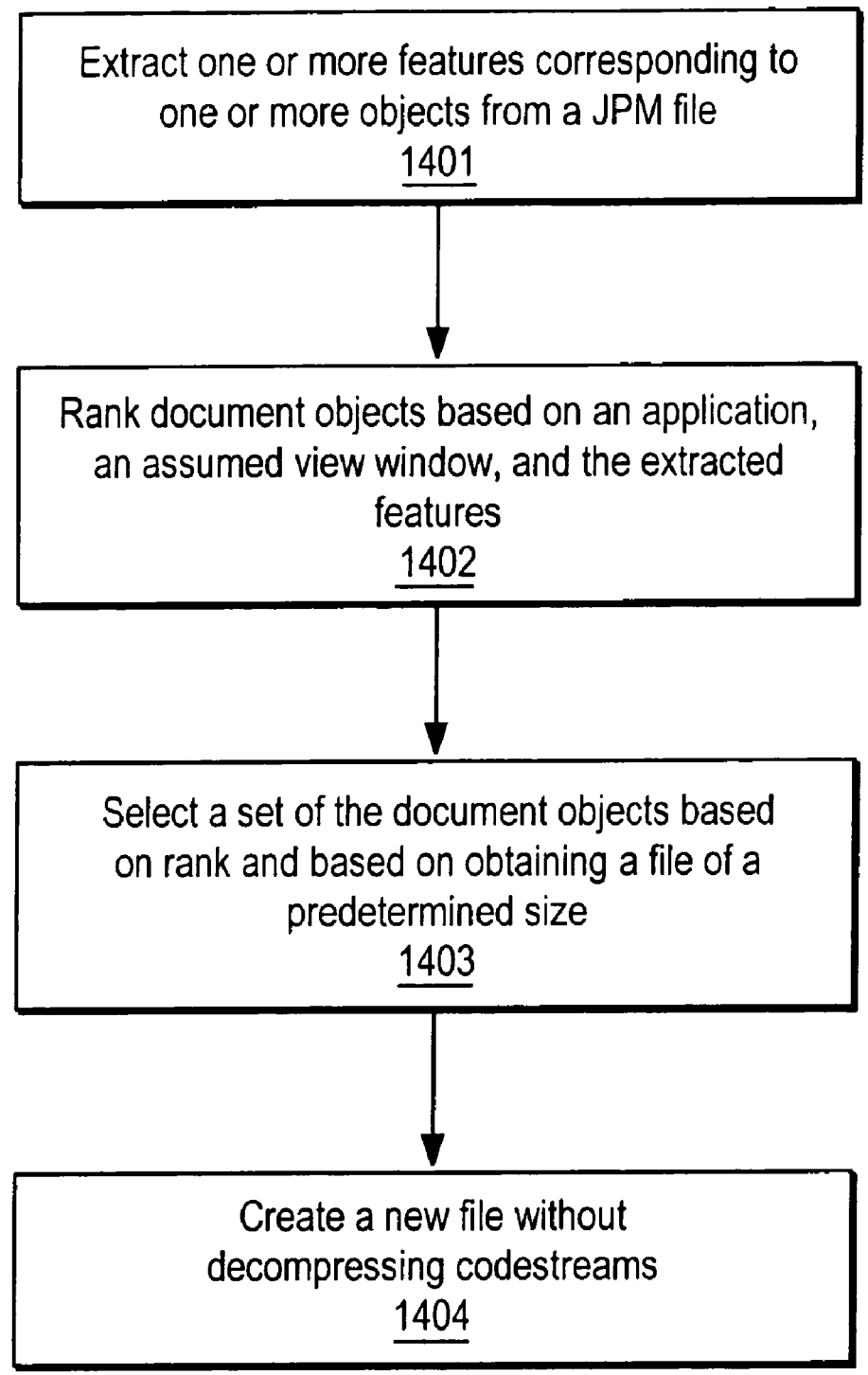
FIG. 14 is a flow diagram of one embodiment of a process for parsing a file.

FIG. 14 is a flow diagram of one embodiment of a process for parsing a file. The process is performed by processing logic that may comprise hardware (circuitry, dedicated logic, etc.), software (such as is run on a general purpose computer system or a dedicated machine), or a combination of both.

Referring to FIG. 14, the process begins by processing logic extracting one or more features corresponding to one or more objects from a JPM file (processing block 1401). In one embodiment, one or more of these features are extracted without decoding. After feature extraction, processing logic ranks document objects based on an application, an assumed view window, and the extracted features (processing block 1402). Once ranking has been completed, processing logic selects a set of the document objects based on rank and based on obtaining a file of a predetermined size (processing block 1403). Thereafter, processing logic creates a new compressed file (processing block 1404). In one embodiment, the original file is a print resolution file and the new without decompressing codestreams file is a screen resolution file.

JPM Headers for Electronic Paper-Like Display

Document image formats are useful in paper-like displays. One feature that may be needed in paper-like displays is the ability to rapidly display multiple pages. Display screens all have limits on the number of different frames that can be displayed. With a very large document with a lot of pages, it may be desirable to display more document pages per second than frames the physical device is capable of displaying. This can be accomplished by merging information from multiple pages and sending an image to the display that represents multiple pages.

Header data from a JPEG 2000 file or JPM file can be used to decide what portion of an image to emphasize in the rapid presentation of multiple pages. In one embodiment, processing logic builds merged images in advance of display. However, if browsing begins before the merged pages can be created, it is possible to select significant regions directly from the header data without decompressing. For example, the bit allocation map, or an image type map, can be built from the header data without decompressing codestreams. Such maps can be compared for multiple pages, and objects of similar type in a similar location on the page could be represented in the merged page by just decoding a low resolution version from one page. Objects types or bit allocation that are different for one page could be emphasized in the merged page. Thus, merged pages could be built in the compressed domain, with object ranking determined from the header data, based on predicted visibility in a rapid display. The selection function could be a limitation on the amount of time available to decode codestreams for display, or a limitation of one object per region on the merged page, or some combination.

Figure 15:
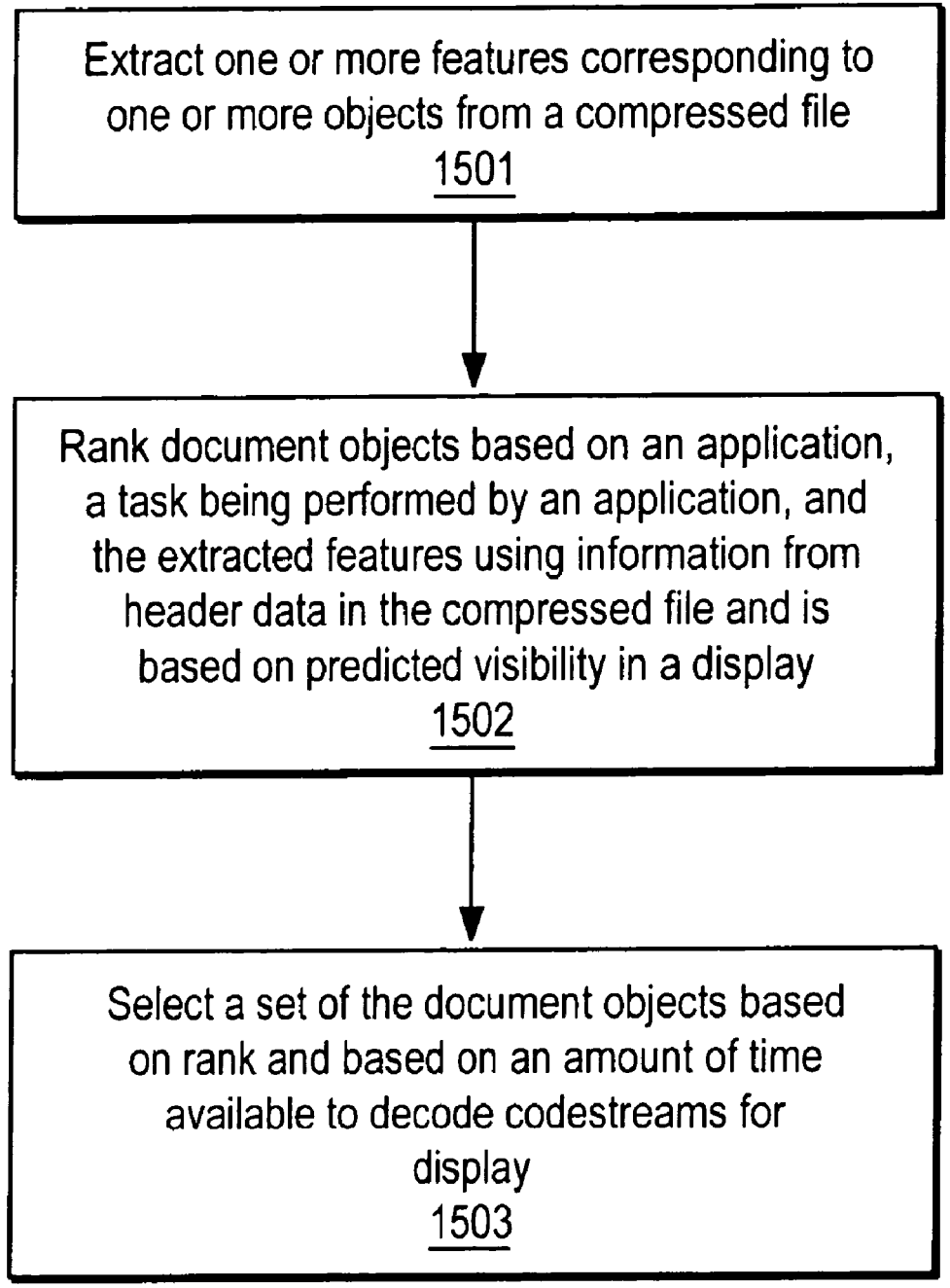
FIG. 15 is a flow diagram of one embodiment of a process for providing image data for rapid displays.

FIG. 15 is a flow diagram of one embodiment of a process for providing image data for rapid displays. The process is performed by processing logic that may comprise hardware (circuitry, dedicated logic, etc.), software (such as is run on a general purpose computer system or a dedicated machine), or a combination of both.

Referring to FIG. 15, the process begins by processing logic extracting one or more features corresponding to one or more objects from a compressed file (processing block 1501). In one embodiment, one or more of these features are extracted without decoding. After feature extraction, processing logic ranks document objects based on an application, a task being performed by an application, and the extracted features and is based on predicted visibility in a display (processing block 1502). In another embodiment, ranking the objects is performed using information from header data in the compressed file.

Once ranking has been completed, processing logic selects a set of the document objects based on rank and based on an amount of time available to decode codestreams for display (processing block 1503). In the embodiment in which ranking the objects is performed using information from header data in the compressed file and is based on predicted visibility in a display, the selection of objects may be based on a limit of one object per region on a page image that represents a merging of multiple pages of a document.

Variable Data Printing

One large document type currently utilized is a large sequence of similar pages with a small amount of changes on each page. For example, the same letter might be sent to multiple people, and only the address information is changed on each page. Sometimes this is called a "mail merge." For advertising, often pages with several images are customized by changing not only the address, but also some of the text depending on the recipient. This is sometimes called variable data printing, and is often done on large high speed printers or presses. Recently, even some of the image portions are changed based on the intended recipient. For large print jobs, the information for all the different pages cannot fit in the memory of the printer at the same time and the data stream feeding the printer is carefully designed to deliver the text or image in time for the printer to render the page and print it, without stopping the paper (which cannot be done on a page by page basis and maintain high speed printing).

It is possible to use the time when the printer or press needs the text or imagery in order to determine the object ranking. Then a JPM file could be delivered in the order needed by the press, using the ranking function. Even when data is not being changed, the ranking function could be used to deliver data based on the printing direction or page number the data is needed in.

Figure 16:
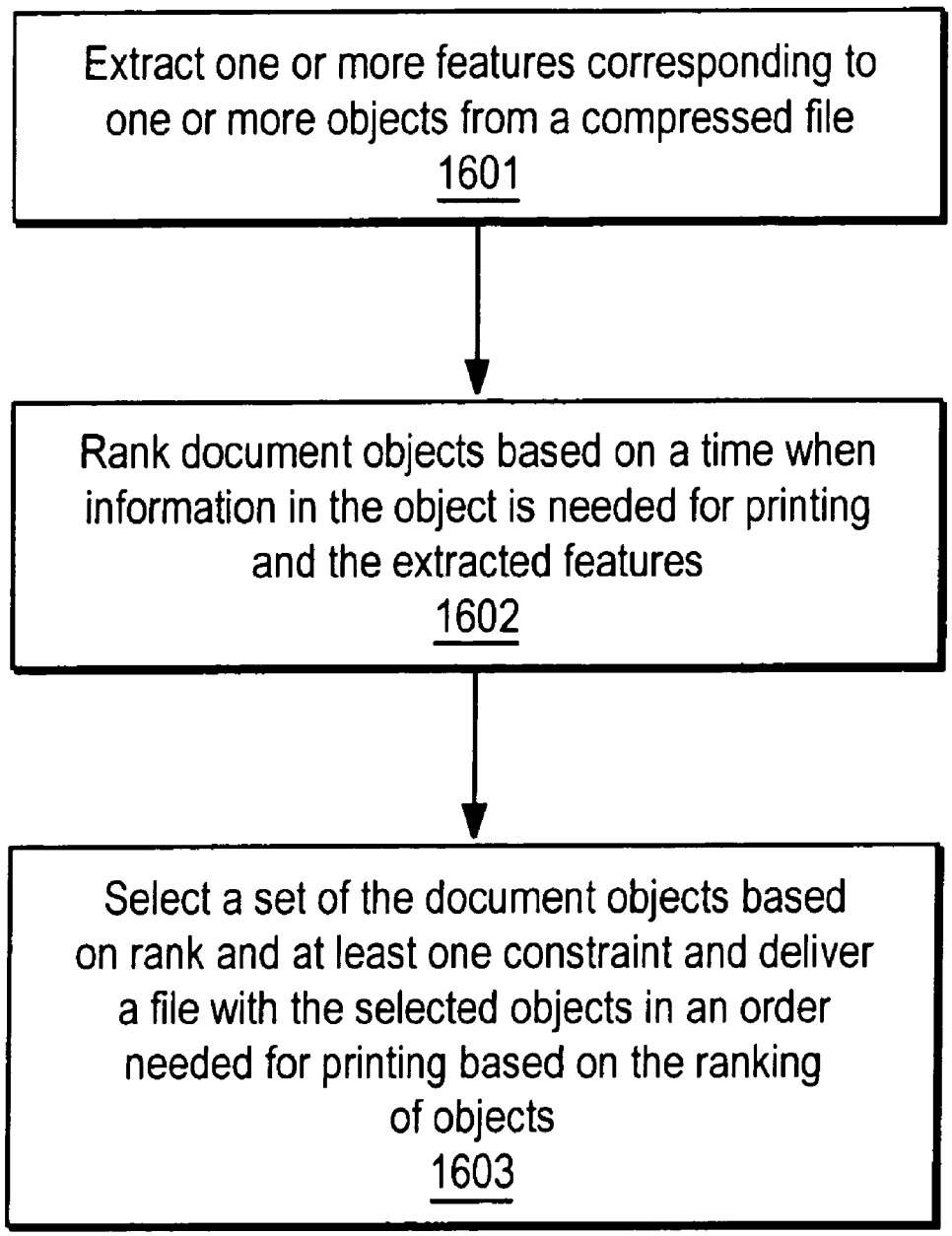
FIG. 16 is a flow diagram of one embodiment of a process for variable data printing.

FIG. 16 is a flow diagram of one embodiment of a process for variable data printing. The process is performed by processing logic that may comprise hardware (circuitry, dedicated logic, etc.), software (such as is run on a general purpose computer system or a dedicated machine), or a combination of both.

Referring to FIG. 16, the process begins by processing logic extracting one or more features corresponding to one or more objects from a compressed file (processing block 1601). In this case, the extracted features indicate when the printer or press needs the text or imagery. In one embodiment, one or more of these features are extracted without decoding. After feature extraction, processing logic ranks document objects based on a time when information in the object is needed for printing and the extracted features (processing block 1602). Once ranking has been completed, processing logic selects a set of the document objects based on rank and at least one constraint and delivers a file with the selected objects in an order needed for printing based on the ranking of objects (processing block 1603).

An Example of a Computer System

Figure 17:
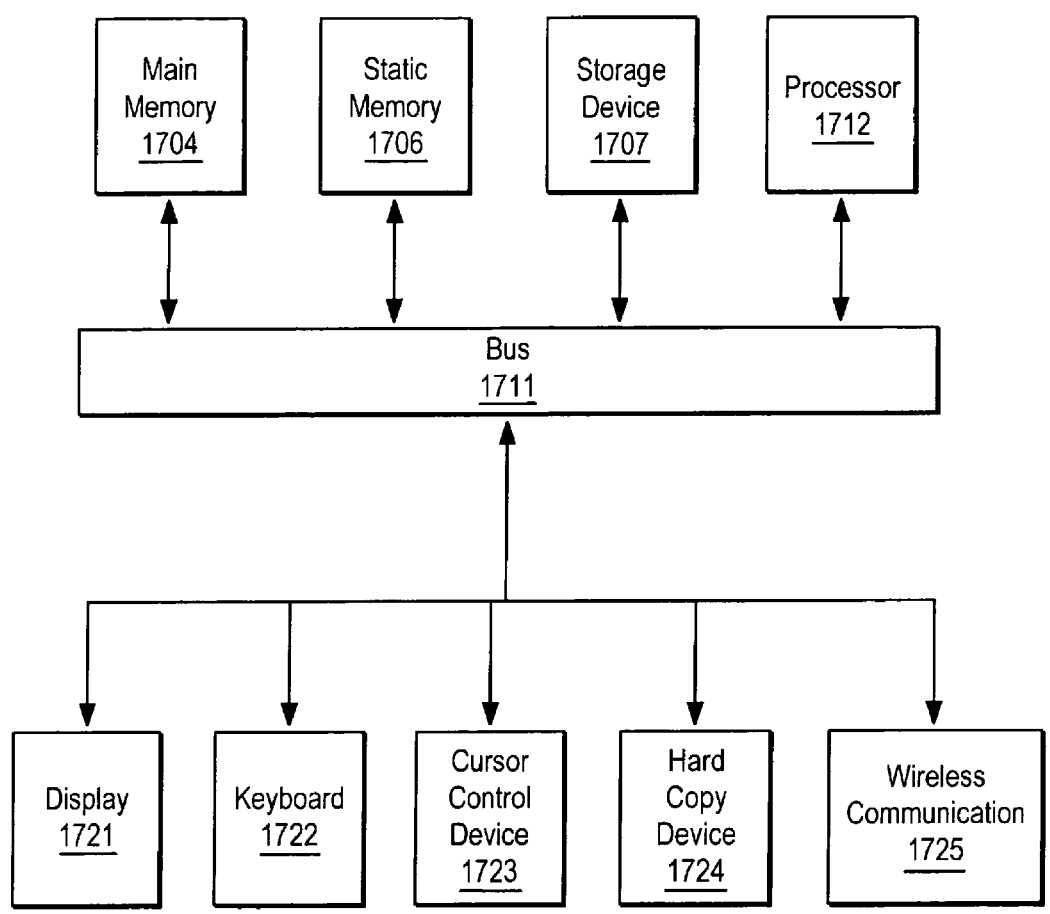
FIG. 17 is a block diagram of an exemplary computer system.

FIG. 17 is a block diagram of an exemplary computer system that may perform one or more of the operations described herein. Referring to FIG. 17, computer system 1700 may comprise an exemplary client or server computer system. The client or server may be part of a multifunction peripheral (MFP). The MFP may be used as a JPIP client. Computer system 1700 comprises a communication mechanism or bus 1711 for communicating information, and a processor 1712 coupled with bus 1711 for processing information. Processor 1712 includes a microprocessor, but is not limited to a microprocessor, such as, for example, Pentium™, PowerPC™, etc.

System 1700 further comprises a random access memory (RAM), or other dynamic storage device 1704 (referred to as main memory) coupled to bus 1711 for storing information and instructions to be executed by processor 1712. Main memory 1704 also may be used for storing temporary variables or other intermediate information during execution of instructions by processor 1712.

Computer system 1700 also comprises a read only memory (ROM) and/or other static storage device 1706 coupled to bus 1711 for storing static information and instructions for processor 1712, and a data storage device 1707, such as a magnetic disk or optical disk and its corresponding disk drive. Data storage device 1707 is coupled to bus 1711 for storing information and instructions.

Computer system 1700 may further be coupled to a display device 1721, such as a cathode ray tube (CRT) or liquid crystal display (LCD), coupled to bus 1711 for displaying information to a computer user. An alphanumeric input device 1722, including alphanumeric and other keys, may also be coupled to bus 1711 for communicating information and command selections to processor 1712. An additional user input device is cursor control 1723, such as a mouse, touchscreen, trackball, trackpad, stylus, or cursor direction keys, coupled to bus 1711 for communicating direction information and command selections to processor 1712, and for controlling cursor movement on display 1721.

Another device that may be coupled to bus 1711 is hard copy device 1724, which may be used for marking information on a medium such as paper, film, or similar types of media. Hard copy device 1724 may be a printer. In one embodiment, the printer may be used as a JPIP client.

Another device that may be coupled to bus 1711 is a wired/wireless communication capability 1725 to communication to a phone or handheld palm device. Note that any or all of the components of system 1700 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:

extracting one or more features corresponding to one or more objects from a file containing two or more codestreams for a selected viewport of a page of the file, including extracting at least one of the one or more features without decoding;

predicting a next viewport of the page from a plurality of different viewports based on a relationship of the next viewport to the selected viewport within the page, the predicted next viewport including one or more predicted objects from the file;

ranking document objects based on a task being performed by an application, the one or more extracted features, and an overlap of document objects with the selected viewport that is to be displayed;

selecting a set of the document objects based on rank and at least one constraint for the selected viewport;

ranking the one or more predicted objects based on the task being performed by the application, the one or more extracted features for the document objects, and a probability that document objects overlap two or more of a plurality of different potential next viewports; and selecting a second set of document objects based on the predicted next viewport of the page and the ranking of the one or more predicted objects without receiving a client request associated with the predicted next viewport.

2. The method defined in claim 1 wherein extracting one or more features comprises determining a spatial bit allocation for the file where the file has a plurality of compression types; and wherein ranking document objects based is based on the spatial bit allocation.

3. The method defined in claim 2 wherein the file comprises either a JPM or PDF file.

4. The method defined in claim 1 further wherein extracting one or more features comprises determining a compression type and object location for each of a plurality of objects in the compressed file without decoding any codestream.

5. The method defined in claim 4 wherein determining the compression type and object location for each of the plurality of objects in the file is based on header data in the file.

6. The method defined in claim 4 further comprising weighting bit allocations differently for at least two of the plurality of compression types.

7. The method defined in claim 1 wherein the file comprises a PDF file with a coordinate transform matrix for each object on a page, and further comprising generating a bit allocation for each bounding box.

8. The method defined in claim 7 wherein generating a bit allocation for each of the bounding boxes comprises generating an indication of an average number of bytes to represent individual objects on a page.

9. The method defined in claim 1 wherein the file comprises a JPM file, and wherein extracting one or more features comprises generating a bit allocation map for the JPM file by:

reading structural information boxes from the JPM file;

selecting a resolution;

determining bit allocations for the selected resolution for the bit allocation map in regions affected by mask and image codestreams of every object on each page.

10. The method defined in claim 9 wherein the structural information includes one or more of Page width, Page height, Compression type, Bounding box (Horizontal offset of the object, Vertical offset of the object, Object width, Object height), Rendering Order, Codestream length, Layout object number, Object type (mask or image or both), NoCodestream flag, Data reference number, and the Offset of the corresponding codestream box from the beginning of a file.

11. The method defined in claim 9 wherein extracting one or more features further comprises classifying objects based on compression type.

12. The method defined in claim 9 wherein extracting one or more features includes extracting an indication of visual impact to a reconstructed page that would occur if an object was skipped during rendering, and wherein ranking the objects is based on the indication.

13. The method defined in claim 1 wherein ranking document objects is based on a mean square error (MSE) measure of each object, wherein the MSE measure is only the weight MSE for a portion of an object that overlaps with the display area that is to be displayed.

14. The method defined in claim 1 wherein ranking document objects is based on keywords specifying interest in specific content.

15. The method defined in claim 1 wherein ranking document objects is based on presence of a type of metadata for an object.

16. The method defined in claim 1 wherein ranking document objects is based on metadata of the file that includes one or more of a group consisting of: metadata indicative of a client machine's interest in an object, MSE information, an object's closeness to a current viewing window.

17. The method defined in claim 1 wherein ranking document objects is based on reading order.

18. The method defined in claim 1 wherein ranking document objects is based on whether one or more objects overlap one or more other objects in the file within the display area that is to be displayed.

19. The method defined in claim 1 further comprising delivering codestreams for objects in the set of objects in response to a request in an order that maximizes quality.

20. The method defined in claim 1 wherein selecting a set of the document objects comprises selecting highest ranking objects until the at least constraint is met.

21. The method defined in claim 1 further comprising storing the set of document objects as a new application specific compressed file.

22. The method defined in claim 1 further comprising:
decoding the set of objects; and
rendering the decoded set of objects.

23. The method of claim 1, wherein a first predicted object is selected for the second set before a second predicted object, the second predicted object having a higher ranking based on the ranking of the one or more predicted objects, when the first predicted object overlaps the predicted next viewport.

24. A non-transitory computer-readable storage medium storing instructions thereon which, when executed by a system, cause the system to perform a method comprising:
extracting one or more features corresponding to one or more objects from a file containing two or more codestreams for a selected viewport of a page of the file, including extracting at least one of the one or more features without decoding;
predicting a next viewport of the page from a plurality of different viewports based on a relationship of the next viewport to the selected viewport within the page, the predicted next viewport including one or more predicted objects from the file;
ranking document objects based on a task being performed by an application, the one or more extracted features, and an overlap of document objects with the selected viewport that is to be displayed;
selecting a set of the document objects based on rank and at least one constraint for the selected viewport;
ranking the one or more predicted objects based on the task being performed by the application, the one or more extracted features for the document objects, and a probability that document objects overlap two or more of a plurality of different potential next viewports; and
selecting a second set of document objects based on the predicted next viewport of the page and the ranking of the one or more predicted objects without receiving a client request associated with the predicted next viewport.

25. An apparatus comprising:
a memory; and
a processor coupled with the memory to execute
an extraction unit to extract one or more features corresponding to one or more objects from a file containing two or more codestreams for a selected viewport of a page of the file, including extracting at least one of the one or more features without decoding, and
a processing unit to predict a next viewport of the page from a plurality of different viewports based on a relationship of the next viewport to the selected viewport within the page, the predicted next viewport including one or more predicted objects from the file, rank document objects based on a task being performed by an application, the one or more extracted features, and an overlap of document objects with a selected viewport that is to be displayed, select a set of the document objects based on rank and at least one constraint for the selected viewport, rank the one or more predicted objects based on the task being performed by the application, the one or more extracted features for the document objects, and a probability that document objects overlap two or more of a plurality of different potential next viewports, and select a second set of document objects based on the predicted next viewport of the page and the ranking of the one or more predicted objects without receiving a client request associated with the predicted next viewport.

26. A method comprising:
extracting one or more features corresponding to one or more objects from a compressed file for a selected viewport of a page of the file, including extracting at least one of the one or more features without decoding;
predicting a next viewport of the page from a plurality of different viewports based on a relationship of the next viewport to the selected viewport within the page, the predicted next viewport including one or more predicted objects from the file;
selecting a set of the document objects based on rank and at least one constraint, the rank based at least in part on an overlap of document objects with a selected viewport that is to be displayed;
ranking the one or more predicted objects based on the task being performed by the application, the one or more extracted features for the document objects, and a probability that document objects overlap two or more of a plurality of different potential next viewports;

selecting a second set of document objects based on the predicted next viewport of the page and the ranking of the one or more predicted objects without receiving a client request associated with the predicted next viewport; and sending the set of document objects and the second set of document objects as pre-fetched compressed image components.

* * * * *